United States Patent [19]

Sekine

[11] Patent Number: 5,481,324
[45] Date of Patent: Jan. 2, 1996

[54] CAMERA

[76] Inventor: Jiro Sekine, 886-47, Oaza Shimomakuri, Koshigaya-shi, Saitama-ken, 343, Japan

[21] Appl. No.: 223,427

[22] Filed: Apr. 5, 1994

[30] Foreign Application Priority Data

Apr. 13, 1993 [JP] Japan .................................. 5-085040

[51] Int. Cl.⁶ .......................... G03B 19/12; G03B 13/08; G03B 7/099
[52] U.S. Cl. .......................... 354/152; 354/154; 354/225; 354/476
[58] Field of Search .................................. 354/152, 154, 354/201, 219, 224, 225, 476

[56] References Cited

U.S. PATENT DOCUMENTS

| | | |
|---|---|---|
| 3,633,481 | 1/1972 | Kuhl . |
| 3,800,309 | 3/1974 | Land ...................................... 354/152 |
| 4,198,146 | 4/1980 | Taguchi et al. . |
| 4,249,814 | 2/1981 | Hull et al. . |
| 4,407,574 | 10/1983 | Tomino et al. . |
| 4,525,744 | 6/1985 | Nakamura et al. . |
| 4,558,922 | 12/1985 | Smith . |
| 4,777,502 | 10/1988 | Lawther . |
| 4,926,201 | 5/1990 | Makai et al. . |
| 5,241,337 | 10/1993 | Betensky et al. . |
| 5,280,387 | 1/1994 | Maruyama . |
| 5,355,166 | 10/1994 | Date et al. . |

FOREIGN PATENT DOCUMENTS 2458194  6/1975  Germany .

Primary Examiner—Michael L. Gellner
Assistant Examiner—Daniel G. Chapik
Attorney, Agent, or Firm—Ronald J. Kubovcik

[57] ABSTRACT

A single-lens reflex type camera which is very more compact than the conventional single-lens reflex camera, or is equal to the COMPACT camera in compactness. Two prisms 4 and 5, between which a slantingly extending low refractive index layer 15 is sandwiched, are positioned between the photographing lens 3 and the photosensitive surface 9. A Fresnel mirror 6 with a reflecting and/or deflecting function is arranged between the prism 5 and the photosensitive surface 9.

19 Claims, 36 Drawing Sheets

CAMERA

BACKGROUND OF THE INVENTION

1. Field of the Invention

The present invention relates to a camera such as a still camera used with a loaded roll film and an electronic camera with a solid-state image element, and more particularly to an improved single-lens reflex camera.

2. Description of the Related Art

Conventional still cameras have been widely used, each in which a rolled film loaded is wound up sequentially to form a camera object image on a photosensitive surface being a frame of film. Electronic still cameras are well known, each of which has a solid-state image element arranged on the photosensitive surface to record photoelectrically a camera object image.

Of the still cameras and electronic still cameras, a so-called single-lens reflex camera is known where a reflex mirror is arranged in the camera body to reflect a camera object image sent via the photographing lens to the viewfinder so that the camera object image can be visually recognized through the viewfinder.

As shown in FIG. 29, the conventional single-lens reflex camera includes a mirror 45 arranged between the photographing lens 3 and the photosensitive surface 9 on which a film is arranged, the mirror 45 being slanted at about 45° with respect to the optical axis of the photographing optical system. In an observation via the viewfinder, the mirror 45 guides the light bundle irradiated from the photographing lens 3 to the viewfinder optical system formed of a field lens 21, a pentagonal Dach (or roof) prism 42, and an eyepiece 13. On photographing, the front end 45b is sprung up on the axially supported rear end of the mirror 45 (in the arrow direction shown in FIG. 29) to withdraw from the optical path of the photographing optical system so that the light bundle hits the film arranged on the photosensitive surface 9.

In the conventional single-lens reflex camera, the mirror 45 has an area substantially entirely covering the photographing surface. The mirror 45 occupies a large space between the lens 3 and the photosensitive surface 9 because the mirror 45 is arranged at a slanting angle of 45° and the front end of the mirror 45 is sprung up at a photographing time to withdraw from the photographing optical system. Hence this problem causes a camera body with large thickness and a large sized photographing lens. The trend toward a large sized lens is remarkable, particularly, to the retorofocus-type wide-angle lens, and the wide-angle series and standard series zoom lenses.

The single-lens reflex camera also includes a pentagonal roof prism 44 arranged above the mirror 45 to correct the vertical and horizontal direction of an image formed by the light bundle guided to the viewfinder optical system. Hence the single-lens reflex lens camera is bulky upward. The above factors make the conventional single-lens reflex camera larger, in comparison with the separate viewfinder-type camera.

No viewfinders are superior to the single-lens reflex viewfinder in that an image itself to be photographed can be observed via the viewfinder. However, it has been considered that large-sizing the camera is avoidable in order to realize the good viewing function.

Although the single-lens reflex viewfinder is Functionally an ideal viewfinder system, the separate viewfinder built-in cameras, in each of which the viewfinder optical system is arranged separately from the photographing optical system, are generally popular among a class of amateur cameramen. The reason seems to be that the space for the mirror expands the camera body forward, thus making the size of the lens large, and the pentagonal roof prism makes the camera body bulky upward, whereby the above factors causes a large-sized camera system.

With the recent compact cameras (such as lens shutter cameras with separate viewfinders) employing zoom lenses, the zoom optical system and the drive mechanism thereof have been built in the viewfinder. Building the complicated mechanism in the narrow space degrades the fundamental function of the viewfinder, or clearness (brightness, image magnifying power, and image quality) and accuracy (visual field ratio, and parallax compensation), whereby a gap in performance between the separate-type viewfinder and the single-lens reflex viewfinder becomes larger and larger. However, it is considered that the fact that the compact cameras are the mainstream in the camera market for amateur cameramen indicates potentially that compactness is the most important factor in cameras for general amateur cameramen.

The body frame of the conventional single-lens reflex camera was structurally completed in 1932 to 1936, and the pentagonal roof prism was employed in the viewfinder in 1929 to 1950. Thus the fundamental frame structure of the single-lens reflex camera was completed in the eras. There has been a remarkable development in the performance of the single-lens reflex camera till now.

However, since the development has been built based on the fundamental frame structure completed in 1936 to 1950, the current single-lens reflex camera became larger according as development in the performance.

The efforts to miniaturize the conventional single-lens reflex camera system has been directed to various single-lens reflex camera forming elements including an integration of the pentagonal roof prism and a condenser lens and an improvement of the swinging mirror movement path. Relatively small single-lens reflex cameras appeared in the commercial market during about 10 years after 1972. However, in the 1980s the development was directed to higher performance regarding an automatic film winding mechanism, an autofocus, a zoom lens, and the like, thus leaving a miniaturization of the single-lens reflex camera behind. For a while, so-called compact cameras (separate viewfinder, lens shutter, and full-automatic function) have become the majority in the camera market. According to data issued from the Japan Camera Industrial Association in 1992, the compact cameras mark a production amount higher by about one figure than that of the single-lens reflex cameras.

There seemingly is a physical limitation to miniaturize the conventional single-lens reflex camera system as long as the camera body includes the mirror space and the pentagonal roof prism.

SUMMARY OF THE INVENTION

In order to overcome the above mentioned various problems, an object of the present invention to provide a single-lens reflex type camera which is remarkably more compact than the conventional single-lens reflex camera, or is equal to the conventional single-lens reflex camera in compactness.

According to the present invention, in order to achieve the above object, the camera is characterized by a photographing lens; a photosensitive surface; a prism body including a first prism and a second prism which are arranged between the photographing lens and the photosensitive surface and in order from the photographing lens, and a low refractive index layer sandwiched between the first prism and the second prism, the low refractive layer spreading slantingly with respect to the photographing system optical axis extending from photographing lens to the photosensitive surface, the a low refractive index layer having a refractive index lower than that of the second prism; a viewfinder optical system; and a reflective optical system arranged so as to reciprocate freely between a reflective position between the prism body and the photosensitive surface and a photographing position withdrawn from the reflective position, the reflective optical system for reflecting a light to the second prism, whereby when the reflective optical system is at the reflective position, the reflective optical system reflects a light extruded from the prism body toward an interface of the second prism in contact with the low refractive index layer, so that the reflected light enters the viewfinder optical system via an adjacent surface arranged near to the viewfinder optical system.

In the camera according to the present invention, a photographing film is arranged on the photosensitive surface, or an imaging device is arranged on the photograph surface.

The first and second prisms are made of optical glass or optical plastic resin, like the conventional prism. The first and second prisms also are formed of a transparent container and a transparent liquid filled in the transparent container.

The low refractive index layer sandwiched between the first and second prisms is air or a transparent material having a refractive index lower than those of the first and second prisms.

The camera according to the present invention includes preferably a sensor for receiving light reflected on the low refractive index layer on the first prism. The sensor may be the so-called TTL photo sensor, or an autofocus adjusting sensor.

The reflective optical system according to the present invention is typically a Fresnel mirror having a condensing and deflecting function. It is preferable that the reflective optical system has a structure so as to move between the reflective position and the photographing position and along the photosensitive surface in the reflective optical system. The reflective optical system may be split to plural elements each of which moves toward the photographing position. In this case, the optical system prepares adjusting means for adjusting the moving stroke of each element.

When being at a reflection position, the reflective optical system acts as a light shielding body by which light is shut from entering the photosensitive surface. When being at a photographing position, the reflective optical system acts as an eyepiece shutter by which a light enters reversely from the viewfinder eyepiece to the photosensitive surface via the viewfinder system.

With a Fresnel mirror prepared as the reflective optical system, a engraved surface formed only on the front surface or rear surface of the Fresnel mirror is used as the Fresnel mirror surface. The Fresnel mirror has its front surface facing the prism body engraved so as to produce a predetermined converging function and its rear surface facing the photosensitive surface engraved so as to produce a predetermined deflecting function and having a mirror surface to reflect a light entering from the front surface toward the front surface. The Fresnel mirror also has its front surface facing the prism body engraved so as to produce a predetermined converging function and its rear surface facing the photosensitive surface engraved so as to produce a predetermined converging function and a predetermined deflecting function and having a mirror surface to reflect a light entering from the front surface toward the front surface. Moreover, some Fresnel mirrors each have its surface facing the prism body engraved in a predetermined cylindrical Fresnel form and its rear surface facing the photosensitive surface engraved in a predetermined cylindrical Fresnel mirror and having a mirror surface reflecting a light entering from the front surface back to the front surface, the front surface and the rear surface having different focus lengths perpendicular to each other.

In the camera according to the present invention, it is preferable to arrange image position compensating means where a camera object image position is compensated in such a manner that a camera object image is formed on a predetermined plane in a reflective optical system when the reflective optical system is at a reflective position and a camera object image is formed on the photosensitive surface when the reflective optical system is at a photographing position.

Moreover, in a preferable aspect of the camera according to the present invention, a data displaying device is arranged, which takes data on the photosensitive surface via an optical path in which a light bundle enters from the adjacent surface of the second prism to the second prism body and reflects on the interface of the second prism body.

In the camera according to the present invention, the viewfinder optical system is formed of a relay lens, and a condenser lens arranged adjacent to the adjacent surface of the second prism. In this case, the relay lens may be a reflective lens.

Moreover, the viewfinder optical system may include a cylindrical lens acting as viewfinder image right/left reversing means.

The viewfinder optical system may include an eyepiece shutter which shuts a light from entering reversely from the viewfinder eyepiece to the photosensitive surface via the viewfinder optical system, in cooperation with the reflective optical system moving to the photographing position.

According to the present invention, the low refractive index layer on the prism body is formed of plural layers in which a light reflected in the reflective optical system at a reflective position and entering the second prism is split at the interface of the second prism in different and plural directions. The viewfinder optical system is formed so as to synthesize light split in plural directions out of the prism.

The camera according to the present invention is totally different from the conventional single-lens reflex camera in structure. The prism body is arranged between the photographing lens and the photosensitive surface. The reflective optical system, that is, a typical Fresnel mirror is arranged between the prism body and the photosensitive surface so as to move freely between the prism body and the photosensitive surface. In the conventional single-lens reflex camera, the distance or lens back between the rear end surface of the photographing lens and the photosensitive surface is about 40 mm. In the camera of the present invention, the distance is halved to 18 mm to 20 mm.

In the conventional single-lens reflex camera, as shown in FIG. 29, the conjugate plane to the photosensitive surface due to the reflective light bundle from the mirror 45 is intricately positioned in the viewfinder optical system to arrange the mirror 45 at an angle of about 45°. In order to construct a viewfinder optical system as compact as possible together with a swinging mirror, it is preferable to use a pentagonal roof prism 44. According to the present invention, the Fresnel mirror, for example, reflects the light advancing near to the photosensitive surface. Hence the plane optically conjugate with the photosensitive surface due to the light bundle reflected by the Fresnel mirror is immediately in front of the Fresnel mirror. A relative long optical path is formed between the conjugate plane and the viewfinder eyepiece. Hence the light bundle is converged along the optical path, relayed with the relay lens, and guided to the viewfinder eyepiece. This feature allows the viewfinder optical system to be constructed without arranging the large-sized pentagonal roof prism built in the conventional single-lens reflex camera.

Various embodiments will be later shown as concrete viewfinder optical systems. However it should note that the viewfinder optical system according to the present invention is not limited only to the specific structures shown in the embodiments.

These and other objects of the present invention will become apparent from the following drawings and detailed description taken in connection with the drawings.

DESCRIPTION OF THE PREFERRED EMBODIMENTS

Various aspects of the present invention will be explained below with reference to the following embodiments.

Figure 1:
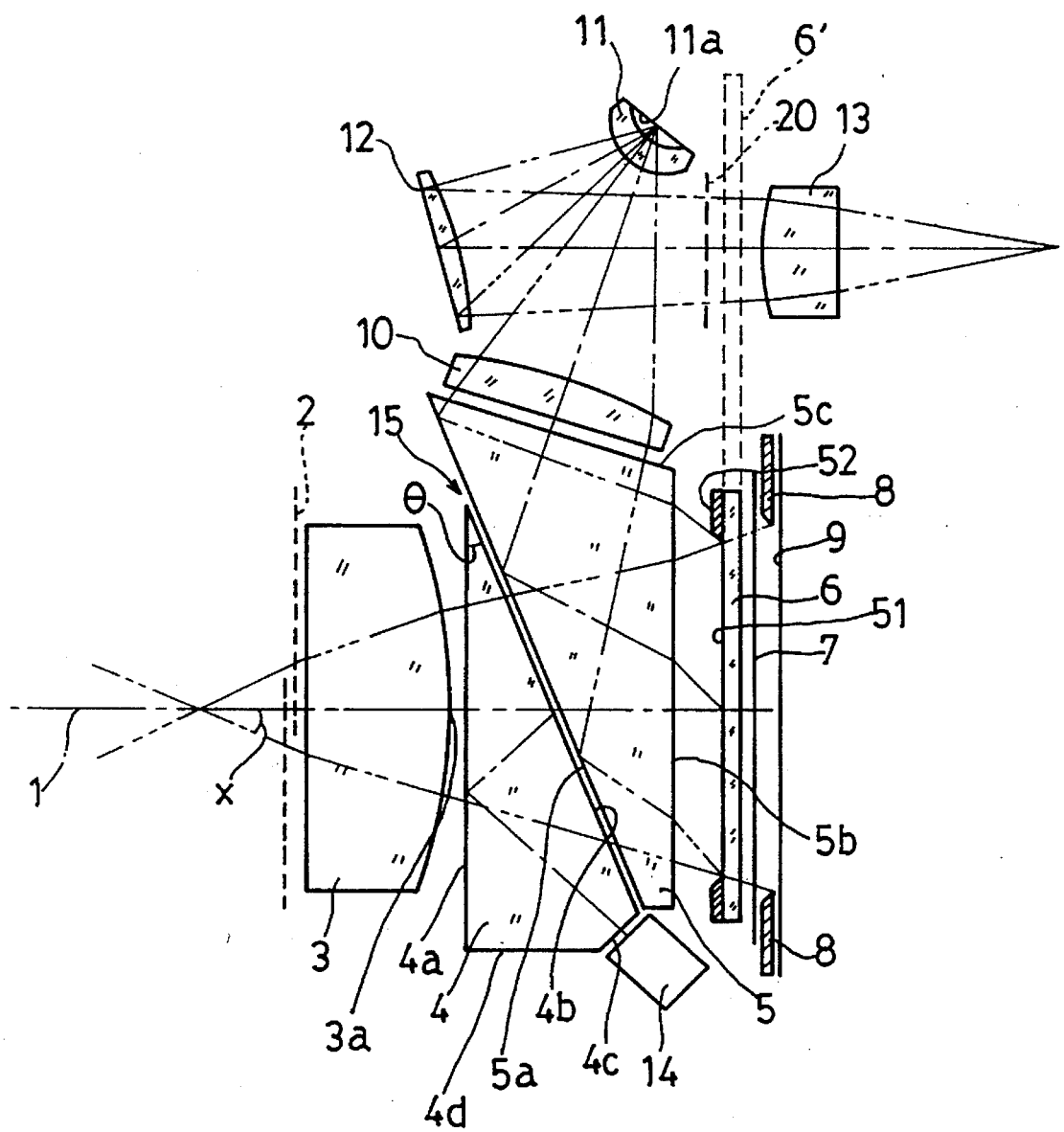
FIG. 1 is a cross-sectional view showing a single-lens reflex camera according to the first embodiment Of the present invention.

FIG. 1 is a cross-sectional view showing the optical system of the camera according to the first embodiment of the present invention. FIG. 1 shows an example employing a focal-plane shutter, with a lens shutter. The first embodiment shown in FIG. 1 will be described below in detail and will be described later various modifications.

In order to improve the entirely enlarged camera with a lens, or the only largest disadvantage of the conventional single-lens reflex camera, the first embodiment shown in FIG. 1 includes the following configuration.

i) Photographing Optical System Configuration:

It is difficult to separate clearly the photographing optical system from the viewfinder optical system. The elements in the optical path for the photographing light bundle are described as a belonging of the photographing optical system. Referring to FIG. 1, between the photographing lens 3 and the photosensitive surface (film surface or image element surface) 9 and sequentially from the photographing lens are arranged (a) a first prism 4 in the photographing optical system, (b) a low refractive index layer 15 formed of a thin air layer, (c) a second prism 5 in a photographing optical system arranged apart from the first prism 4 and the low refractive index layer 15, (d) a Fresnel mirror 6, (e) a shutter curtain 7 with a focal-plane shutter, and (f) an image frame 8. The front portion of the photographing lens 3 is not shown in FIG. 1. When the lens shutter is used, the shutter diaphragm is arranged between lenses or on the image surface side. In FIG. 1, the so-called between shutter with the shutter diaphragm arranged between the lenses is indicated in broken lines.

ii) Viewfinder Optical System Configuration:

There are various types of viewfinder optical system. The viewfinder in the first embodiment shown in FIG. 1 includes the following elements: (g) a condenser lens arranged above the second prism 5 in the photographing optical system, (h) a reflective relay lens 11 arranged further above the condenser lens 10, (i) a reflective field lens 12 arranged so as to face (in front of) the lower camera object below the relay lens 11, and (j) an eyepiece 13 arranged so as to face the photographer at the reflective field lens 12 (on the image surface side).

In FIG. 1, the portions with no relation to the nature of the present invention is omitted, including a camera body, a lens mount, a iris diaphragm between lenses, a lens shutter or focal-plane shutter drive mechanism, and a Fresnel mirror withdrawing and invading drive mechanism.

Here, the case where the focal-plane shutter with a simple operation is employed will be described below. The specific function required in the use of the lens shutter will be later described.

In FIG. 1, the Fresnel mirror 6 is arranged at a position shown in the solid line (referred to a reflective position in the present invention) at an observation through the viewfinder. The light bundle passing through the photographing lens 3 enters the first prism 4 in the photographing optical system from the prism surface 4a and leaves the prism surface 4b of the first prism in the photographing optical system.

The light bundle irradiated to the first prism 4 in the photographing optical system passes through the prism surface 4b. Whether the light bundle goes out of the first prism 4 in the photographing optical system or is perfectly reflected is determined by the refractive index Nd of the prism material, the slant angle q of the prism surface 4b, and the angle x with respect to the optical axis 1 of the light beam entering the photosensitive surface 9. These factors is studied in another item. First of all, in the embodiment shown in FIG. 1, the prism has the following dimensions:

(1) Prism material: Optical glass BK7,
  Refractive index
  Nd=1.51633,
  Critical angle ic sin ic=1/Nd,
  ∴ic=41.2608°
(2) Slant angle of prism surface q=22°
(3) Screen size: 24×36 mm²

Selection of the prism material and determination of the slant angle of the prism surface will be described in detail in another item.

After passing through the low refractive index layer (hereinafter referred to an air layer) 15 being a thin air layer, the light beam from the prism 4 enters the second prism 5 in the photographing optical system from the prism surface 5a and then goes out of the prism surface 5b of the prism 5.

The prism surface 4a and the prism surface 5b are substantially perpendicular to the optical axis 1 and are substantially parallel to each other. The air layer 15 is not so thin as to produce an interference fringe and is not so thick as to produce various aberrations.

The Fresnel mirror 6 reflects the light beam from the prism 5 with a deflection angle toward the second prism. The Fresnel mirror 6 has a fine groove structure mirror-processed to its front surface and rear surface to produce a light condensing and deflecting function. The fine groove structure deflects and reflects the light beam entering along the optical axis of the photographing optical system at 45° upward.

The light bundle which enters the photosensitive surface at a photographing time to make a camera object image is reflected by the Fresnel mirror 6 at a viewfinder observation time to form an inverted image in the vicinity of the prism surface 5b. Then the flux re-enters the prism 5 via the prism surface 5b. After entering perpendicular to the Fresnel mirror 6 along the optical axis of the photographing optical system, being refracted and reflected about 45° upward, and entering the prism 5 at an incident angle of about 45°, the light beam travels in the prism 5 with a refractive angle of about 28°. The light beam which advances upward and in the left direction at an angle of 28° with respect to the optical axis 1 enters the prism surface 5a with an incident angle of 50°, the prism surface 5a being sloped at 22°. Since the incident angle exceeds the critical angle of 41.2608°, the incident light beam is perfectly reflected to advance at about 18° upward and slightly toward the rear side.

The light beam, which travels further upward and out of the prism surface 5c of the prism 5, arrives at the reflective relay lens 11 via the condenser lens 10. The exit pupil image of the photographing lens is formed near to the entrance pupil position of the reflective relay lens 11 because of the weak light condensing function of the Fresnel mirror 6 and the strong light condensing function of the condenser lens 10. The Fresnel mirror 6 reflects the camera object image formed by the photographing lens 3 to form a aerial image near to the prism surface 5b. The photographer observes the image through the eyepiece 13.

The image itself to be taken at a photographing time, which is guided to the viewfinder optical system at a viewfinder observation time via the above optical path, is observed by the photographer.

At photographing, the Fresnel mirror 6 is withdrawn to the position (shown in broken line) 6' away from the optical path of the photographing optical system to avoid the light inversely entering from the eyepiece 13. The camera object image is recorded on the photosensitive surface 9 through the shuttering operation of the focal-plane shutter curtain 7. When the shuttering operation of the focal-plane shutter curtain 7 has been completed, the Fresnel mirror 6 is restored to the position (shown in solid line) so that the photographer can re-observe the camera object image.

When the Fresnel mirror 6 is withdrawn outside the photographing optical system, the prisms 4 and 5 function as one-piece parallel-plane glass. Therefore, previously designing the photographing optical system, in consideration that the parallel plane glass blocks intervenes, can secure sufficiently the image forming performance. This means that there is no problem in performance same as a three primary color spectroscopic prism is arranged in the TV photographing optical system, Technicolor photographing optical system, or the like.

When the single-lens reflex camera shown in FIG. 1 is used, the specifications required for the photographing lens, the optical element, and various mechanism are as follows:

(1) The distance between the lens rearmost end 3a and the photosensitive surface 9, that is, the lens back, is about 18 mm in the embodiment shown in FIG. 1. In this case, the optical effective length is about 13.9 mm because the extension of (Nd−1)/Nd of the prism made of the glass BK7 with about 12 mm thick is subtracted. The limitation in the lens design is further generous, in comparison with the design of the conventional single-lens reflex camera requiring a distance of about 45 mm for the lens. It may be said that the lens back is negligible to the lens design limitation.

(2) When the light beam enters the prism surface 4b with an angle exceeding the total reflection critical angle, it cannot pass through the prism surface 4b. Hence both the refractive index Nd and the slant angle q of the substance of the prism 4 restrict the light exiting iris size and the position of the photographing lens 13.

A pin hole lens is studied for its simple explanation. The limitations in which the pin hole lens produces its total reflection are shown in the Table 1.

TABLE 1

|  | Glass material: BK7 Nd = 1.51633 Critical angle i = 41.2608° | | | Glass material: SF2 Nd = 1.64769 Critical angle i = 36.3664° | |
| --- | --- | --- | --- | --- | --- |
| Prism slant angle | θ = 20° | θ = 22° | θ = 24° | θ = 20° | θ = 24° |
| Image angle | 86.80° | 79.98° | 73.04° | 77.28° | 63.03° |
| Focus distance | 22.95 mm | 25.87 mm | 29.31 mm | 27.14 mm | 35.39 mm |

The area of the light exit pupil in an actual lens provides some limitations in the pupil size. Now let us assume that the light entrance pupil and the light exit pupil are at the same position and has the same area. If the light entrance pupil and the light exit pupil have a focus distance of 28 mm and 35 mm, respectively, the allowable F-values are shown in Table 2.

TABLE 2

|  | Glass material: BK7 Nd = 1.51633 Critical angle i = 41.2608° | | | Glass material: SF2 Nd = 1.64769 Critical angle i = 36.3664° | |
| --- | --- | --- | --- | --- | --- |
| Prism slant angle | θ = 20° | θ = 22° | θ = 24° | θ = 20° | θ = 24° |
| Focus distance 28 mm | 2.93 | 7.83 | — | 20.36 | — |
| Focus distance 35 mm | 1.54 | 2.28 | 4.15 | 3.22 | — |

The above table indicates that a higher reflective index tends to occur the total reflection, thus limiting the use of the small F-number, wide-angle lens. Hence it is desirable to use an optical material having a low refractive index of BK7.

The prism with a small slant angle seems to be advantageous in view of no total reflection. However, in consideration of the viewfinder where a light bundle can be easily taken out, and the reduced light bundle guide and lens back to the TTL light measuring system sensor 14, it is suitable that the slant angle q is about 22°.

F-number shown in Table 2 are calculated on condition that the light entrance pupil and the light exit pupil are substantially at the same position and has the same area. The limitation is largely moderated to the lens which does not satisfy the premise. For example, when the telecentric optical system where the light bundle is produced substantially in parallel light beam from the rear lens of the lens unit is used as the photographing lens, there are no limitations to the focus distance and the F-number. Moreover even if the photographing lens is not the perfect telecentric optical system but if the photographing lens is the optical system added the telecentric factor, because the light bundle passed through the lens is within an angle less than previously calculated image angle of the pin hole lens, the lens factors, e.g. focal distance or F-number, are not restricted.

Naturally, long focus lenses and telephoto lenses in addition to the retro-focus lenses are not limited to the focus distance and the F-value.

(3) In the above mentioned study, optical glass BK7 and SF2 are used as the material of the prisms 4 and 5. However, optical plastic resins may be used for the above prism material. A transparent liquid filled in a transparent container and made optically with sufficient accuracy may be used for the prism material.

The prism 4 may be formed of a relatively low refractive index material to avoid a total reflection while the prism 5 may be formed of a material of a high refractive index material to produce a total reflection. The prism 4a may be arranged in no parallel with the prism 5b.

(4) The air layer or a low refractive index layer 15 sandwiched between the prisms 4 and 5 has two aspects: a function working as an optical element for passing the light bundle traveling to the photosensitive surface 9, and a function working as a non-transparent optical element for total reflecting the light bundle deflected and reflected from the Fresnel mirror to the lens 3.

The low refractive index layer 15 is needed to be an optical material with a refractive index lower than that for the prism 5. The air layer is suitable used functionally on manufacture.

As described above, the thickness of the low refractive index layer 15 is not so thin as to appear interferance fringe and is not so thick as to produce various aberrations.

Figure 2:
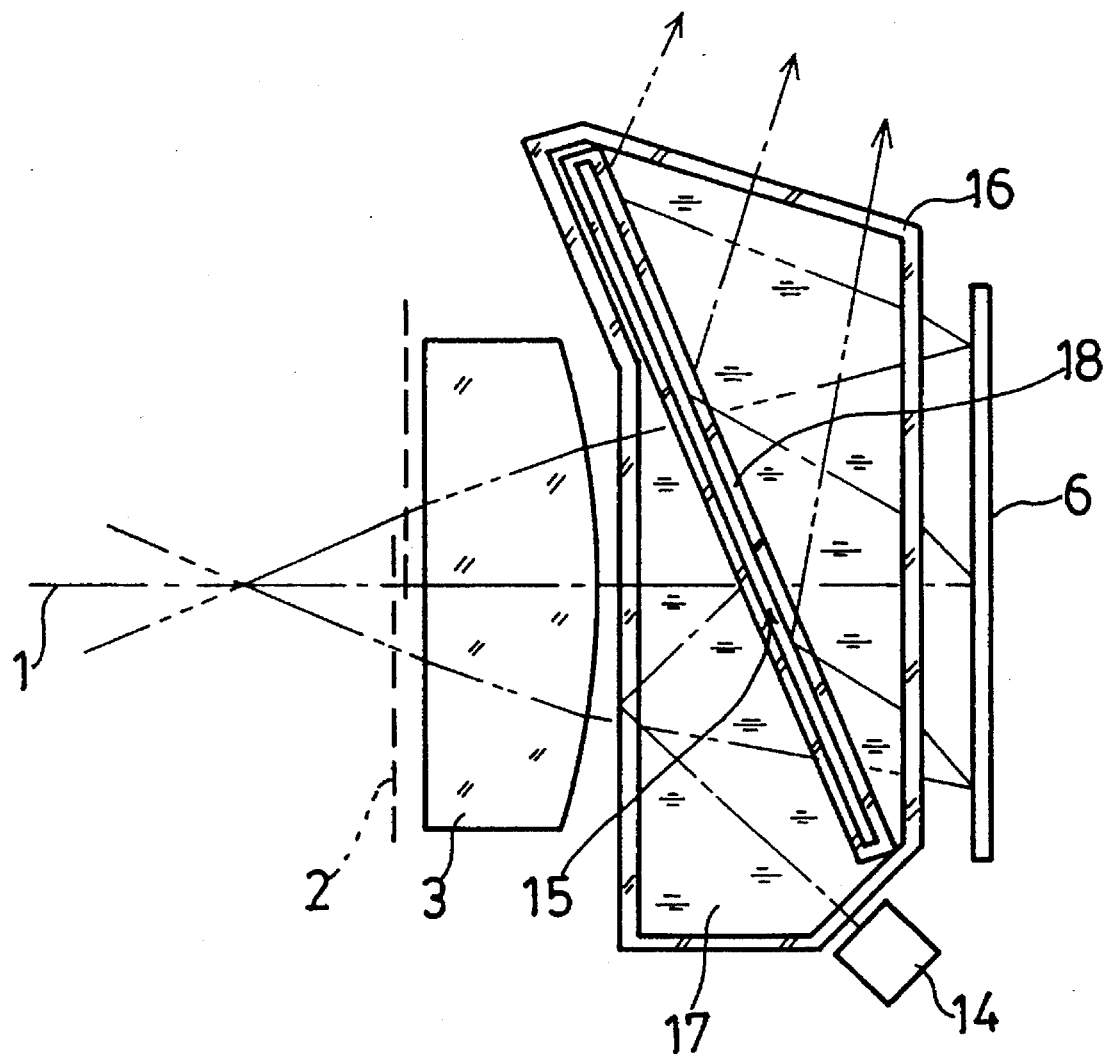
FIG. 2 is a cross-sectional view showing a liquid prism according to an embodiment of the present invention.

(5) As shown in FIG. 2, a transparent and refractive optical element which is formed of a transparent container 16, a transparent liquid 17 filled therein, and an air layer forming material 18 in the transparent liquid can be used instead of the prisms 4 and 5 shown in FIG. 1.

(6) The Fresnel mirror 6 shown in FIG. 1 converts optically a diverging light bundle into a parallel or slightly converging light bundle, the diverging light bundle being produced from the light exit pupil (referred to FIG. 4 to be described later) IT of the photographing lens 3 positioned (virtually) at the photosensitive surface 9 a (an assumed) distance of 50 mm apart and on the optical axis of the photographing optical system 1. In other words, the Fresnel mirror 6 has a focus distance of 50 mm or shorter and reflectively deflects the light bundle entering along the optical axis of the photographing optical system at a deflection angle of 25°.

FIGS. 4, 5, 6, 22, and 23 are perspective cross-sectional views showing a model structure of the Fresnel mirror. The actual Fresnel mirror has a front surface and a rear surface each having a fine structure of an order of $10^{-2}$ mm.

Figure 4:
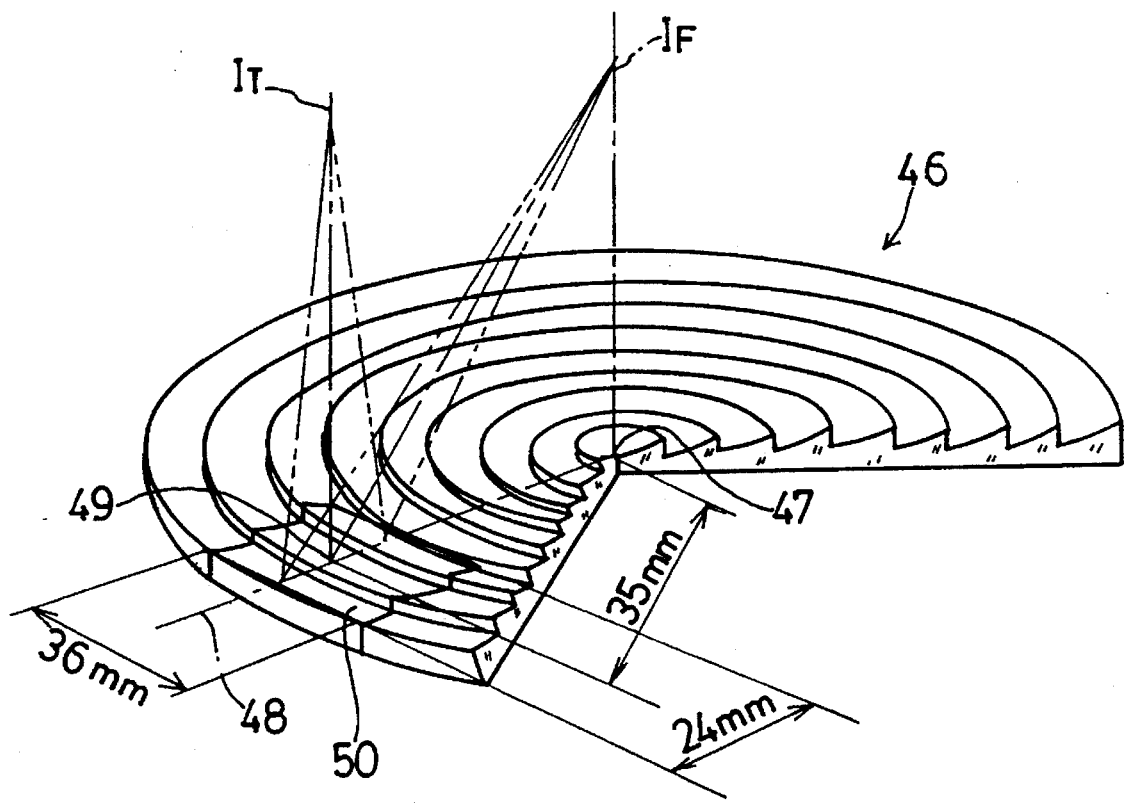
FIG. 4 is a perspective cross-sectional view showing a conventional Fresnel mirror.

The Fresnel mirror 6 in a wide disc form, shown in FIG. 4, has a focus distance of 50 mm or slightly shorter. The Fresnel mirror has an optical function similar to the rectangular portion 50 of 24×36 mm (with sides perpendicularly to the radius 48, 18 mm apart, and sides in parallel to the radius 48, 24 mm apart) which has the middle point 49 being on the radius 48 passing through the center (optical axis) 47 of the Fresnel mirror 6 and at a distance from the center 47, 35 mm apart.

In FIG. 4, the Fresnel mirror structure engraved on the surface of the Fresnel mirror 6 condenses and deflects the weak diverging light bundle which is sent from the light exit pupil IT of the photographing lens 3 positioned vertically and upward to the center 49 of the rectangular portion 50. An image of the light exit pupil IT of the photographing lens 3 is formed on the light entrance pupil IF in the viewfinder optical system positioned vertically to the center 47 of the large Fresnel mirror disk.

Figure 5:
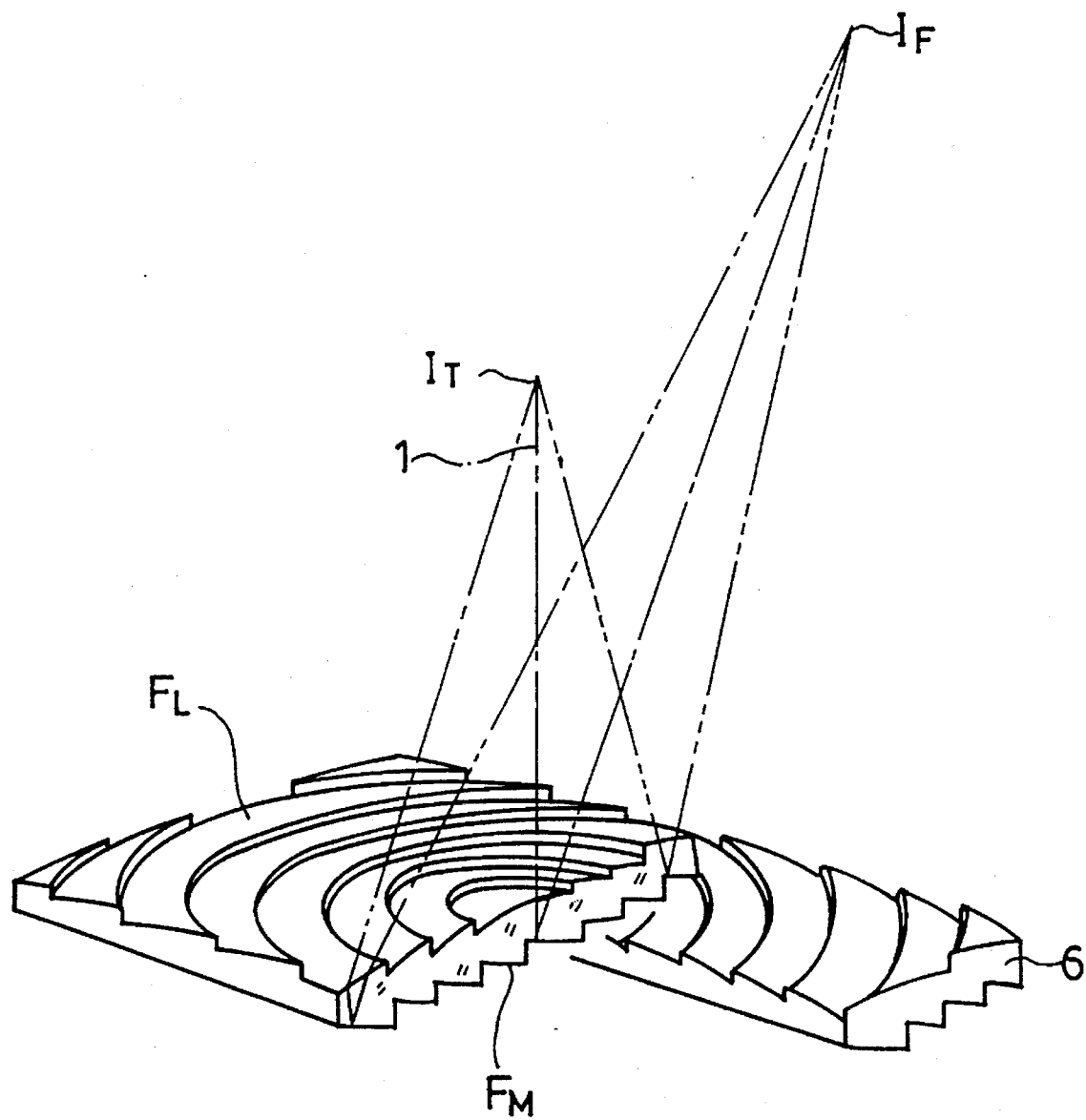
FIG. 5 is a perspective cross-sectional view showing a Fresnel mirror according to the first embodiment of the present invention.
Figure 6:
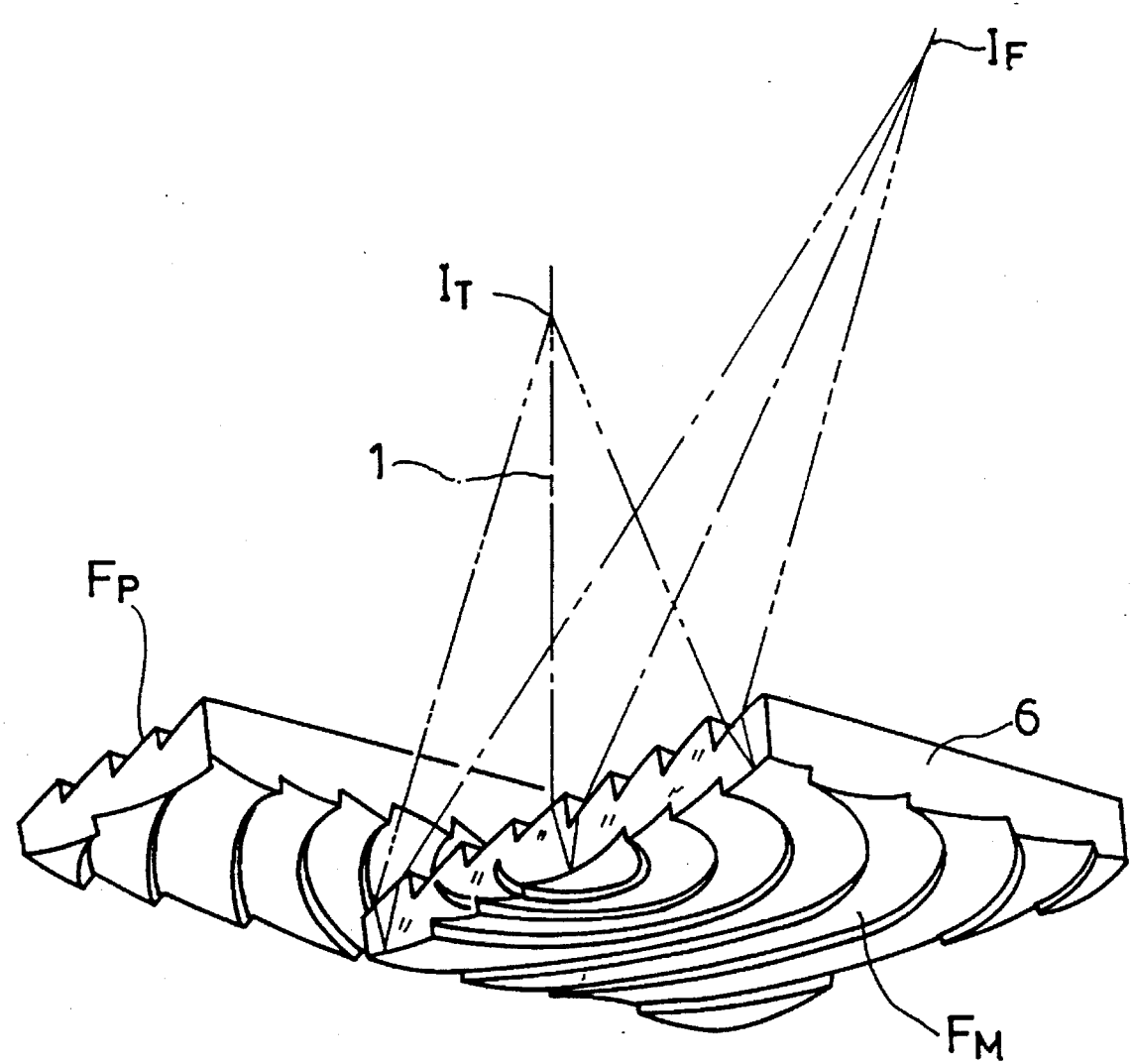
FIG. 6 is a perspective cross-sectional view showing a Fresnel mirror according to the second embodiment of the present invention.

As shown in FIGS. 5 and 6, the luminous converging function and the deflective and reflective function of the Fresnel mirror may be separately engraved on the front side and the rear side of the Fresnel mirror. The function separation-type Fresnel mirror has the front surface utilizing the refractive function of a transparent substance and the rear surface utilizing the reflective function.

In FIG. 5, a Fresnel lens structure FL with a condensing function is engraved on the front surface of the Fresnel mirror 6. A Fresnel lens structure FM with a deflective and reflective function is engraved on the rear surface of the Fresnel mirror 6. The diverging light bundle which are produced from the light exit pupil IT of the photographing lens 3 positioned on the optical axis of the Fresnel mirror 6 is subjected to a light condensing function of the Fresnel structure FL of the front surface of the Fresnel mirror 6 and to the deflective and reflective function of the Fresnel mirror structure FM. After the light bundle is again subjected to the diverging function of the Fresnel lens structure FL, an image of the light sending pupil IT of the photographing lens 3 is formed on the light receiving pupil IF in the viewfinder optical system via the Fresnel mirror 6.

In FIG. 6, the Fresnel mirror 6 has a Fresnel prism structure FP with a deflective and refractive function on the front surface thereof and a Fresnel prism structure FM with a condensing function on the rear surface thereof. The diverging light bundle produced from the light exit pupil IT of the photographing lens 3 is subjected to a deflection function of the Fresnel prism structure Fp of the front surface of the Fresnel mirror 6, and is condensed and reflected by the Fresnel prism structure FM of the rear surface of the Fresnel mirror 6. After the diverging light bundle is re-subjected to a reflection function of the Fresnel prism structure Fp, it travels out of the Fresnel mirror 6 to form an image of the light exit pupil IT of the photographing lens 3 on the light pupil IF in the viewfinder optical system.

According to the present embodiment shown in FIG. 1, the Fresnel mirror 6 covers the front plane of the focal-plane shutter 7 and the photosensitive surface 9 at a viewfinder observation time. The Fresnel mirror 6 also is withdrawn from the position (shown in broken line 6') to the optical path of the photographing optical system at a photographing time to shield the optical path of the viewfinder optical system, whereby the light reversely entering through the viewfinder eyepiece 13 is shielded.

A separate member may be used to cut the reversely entering light. In the case of the lens shutter, since only the Fresnel mirror covers the photosensitive surface, it is not needed that a separate light shielding member and the eyepiece shutter 20 shut the light entering reversely from the viewfinder eyepiece lens 13 before the Fresnel mirror 6 starts to withdrawn from the front plane of the photosensitive surface 9.

The Fresnel mirror 6 shown in FIG. 1 is formed of one piece member. However, the Fresnel mirror 6 may be formed of two upper and lower split members so as to part at a photographing time, thus withdrawing from the optical path in the photographing optical system.

The Fresnel mirror 6 in the embodiment shown in FIG. 1 is arranged to be perpendicular to the optical axis of the Fresnel mirror 6. However, the Fresnel mirror 6 may be arranged so as to slant slightly upward (toward the viewfinder optical system side). The sloped arrangement allows the aerial image plane formed reflectively by the Fresnel mirror 6 to erect more perpendicularly to the optical axis of the viewfinder optical system. Thus there is an advantage that it is possible to moderate the slant of the Fresnel groove structure engraved on the front and rear surfaces of the Fresnel mirror 6, in addition to the image perspective deformation (image magnifying power difference due to the perspective difference of an image distance).

According to the embodiment shown in FIG. 1, the Fresnel groove which is engraved on the front surface and the rear surface of the Fresnel mirror 6 is processed to make an optically smooth surface to form an aerial image by the reflected light bundle. However, the Fresnel groove may be formed to a micro rough surface to scatter slightly the light bundle. Thus the structure can provide the degree of the focusing state visually detected (to provide a focusing screen function) as well as the moderation of the narrow viewfinder visual field when the light exit pupil position due to an lens exchange or zooming is changed. In this case, because being not positioned on the focus plane of the photographing optical system, the Fresnel mirror 6 in the embodiment shown in FIG. 1 requires an image position compensating mechanism for moving an image forming position on the Fresnel mirror surface at a viewfinder time. As a matter of course, the image position compensating mechanism is released at a photographing time. The image position compensating mechanism will be described in detail in another embodiment.

(7) The condenser lens 10 converts the light bundle substantially in parallel or slightly converged and perfectly reflected by the prism surface 5a into a strong converging light bundle to condense to the pupil of the reflex relay lens 11. In other wards, the focus of the condenser lens 10 is positioned near to the pupil position of the reflex relay lens 11.

It may be considered that the condenser lens 10 is substituted for the Fresnel mirror 6 with strong converging function. However, when the light bundle converged by the Fresnel mirror 6 with strong converging function enters to the prism surface 5a, the incident angle of the peripheral light beam on the half side of the light bundle is smaller than the total reflection critical angle, whereby no total reflection may occur. That is, it is needed that the incident light bundle to the prism surface 5a are substantially in parallel. Hence it is desirable that the Fresnel mirror 6 has a moderate converging function but the condenser lens 10 has a strong converging function. In other words, the optical system shown in FIG. 1 is a kind of telecentric-type optical system.

In the telecentric optical system, an iris diaphragm is arranged at one focus position of a lens. The lens converts a parallel light bundle component entering from another direction to a converging light bundle to concentrate to the iris diaphragm arranged at the focus position. The iris diaphragm passing light bundle forms an image at a position corresponding to the distance to an object. The condenser lens 10 is a primary lens in the telecentric optical system. The reflex relay lens 11 is originally arranged at a position where the iris diaphragm is arranged.

In the first embodiment shown in FIG. 1, the focus position of the condenser lens 10 is adjacent to the pupil position of the reflex relay lens 11. The focus position of the condenser lens 10 on the opposite side is adjacent to the prism surface 5b where the primary aerial image is formed in the photographing optical system. If only the iris diaphragm is arranged, the condenser lens 10 re-forms the secondary image of the aerial image of the pupil of the relay lens 11 as an enormous image at an infinite position, whereby the present viewfinder system cannot be materialized. That is, the relay lens acts as a image reduction lens.

(8) A conventional transparent-type lens may be employed as a relay lens (image reduction lens) together with a single mirror to deflect the optical path. However, arranging a single optical element requires a large space. Selection a reflection-type lens can halve the lens in size and can remove the mirror space.

The reflex lens, each of which lenses is symmetrically arranged before and behind the iris diaphragm, can be sufficiently used in the viewfinder optical system. The reflex lens, for example, includes the mirror 11a arranged at a position of a conventional typical iris diaphragm in Orthometa, Gauss, or a super wide-angle series TOPOGON, HOROGON, AVIOGON, HYPERGON, or the like. Since the reflex lens is constituted of only the front lens group (half lens group), the constructing lenses can be halved in number and size.

The present viewfinder optical system, which needs an image angle of about 90° as the relay lens, requires a wide-angle lens. The optional range is wide.

Figure 33:
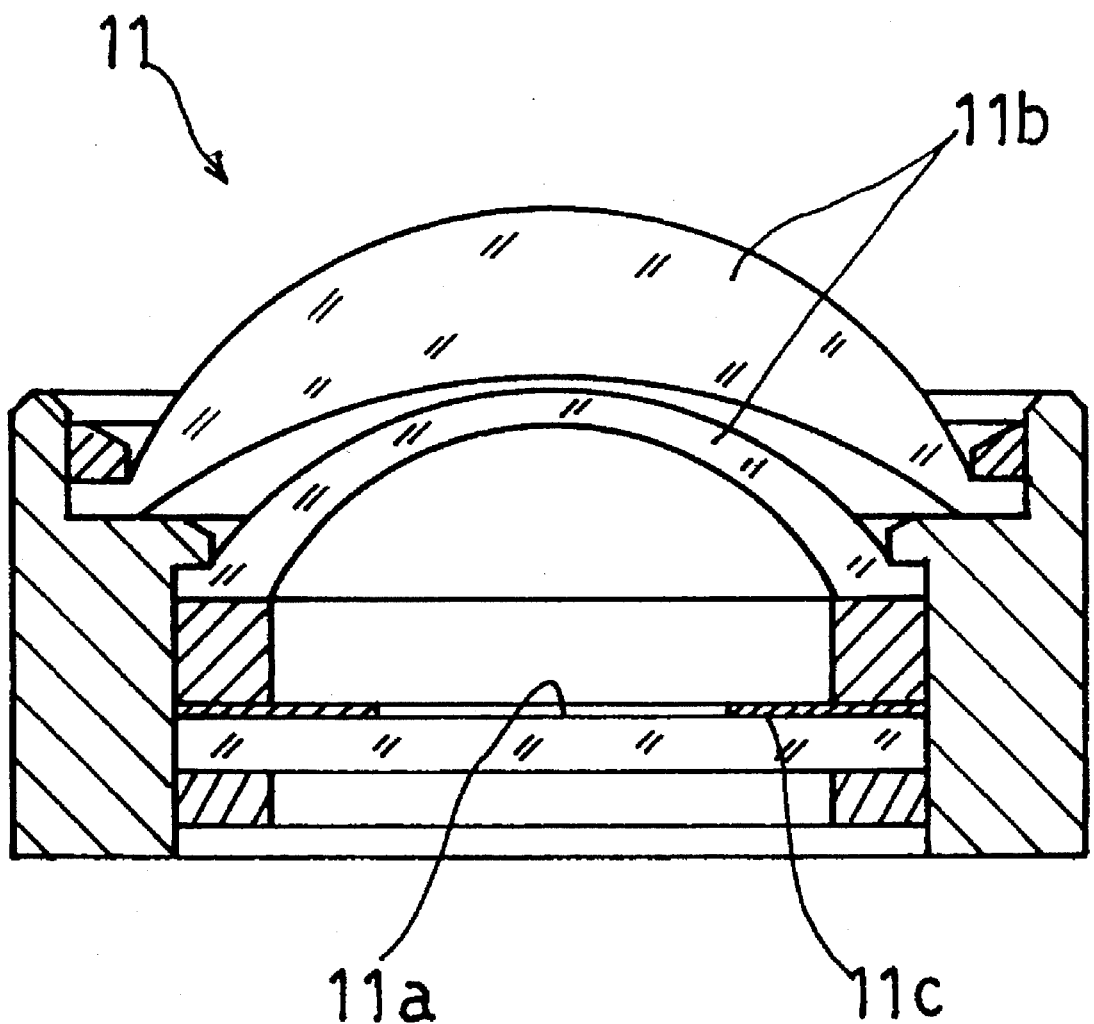
FIG. 33 is a diagram showing a reflex relay lens according to an embodiment of the present invention.

FIG. 33 shows a structural example of the reflex relay lens 11. The example shown in FIG. 33 is conventionally known as TOPOGON-type lens which is formed by modifying a super wide-angle lens to a reflex-type lens. The lens unit 11b is constituted in half of the TOPOGON-type super wide-angle lens structure. The fixed iris diaphragm 11c and the mirror 11a are arranged one over the other at an original iris diaphragm position to form a reflex relay lens. In the present embodiment, one that the TOPOGON-type lens is modified to a reflex-type lens is used. However, another-type lens such as HOROGON can be easily modified as a reflex-type lens.

(9) The reflex-type relay lens 11 forms a secondary reformed image near to the field lens 12. The embodiment shown in FIG. 1 employs the reflex-type field lens 12. However, a concave mirror may be used. In the present embodiment, since it is difficult to ensure a space for the transparent-type field lens, the reflex-type optical elements (lenses or mirrors) are suitable to save the space.

(10) Explanation will be made below as for the field display within the viewfinder.

Figure 11:
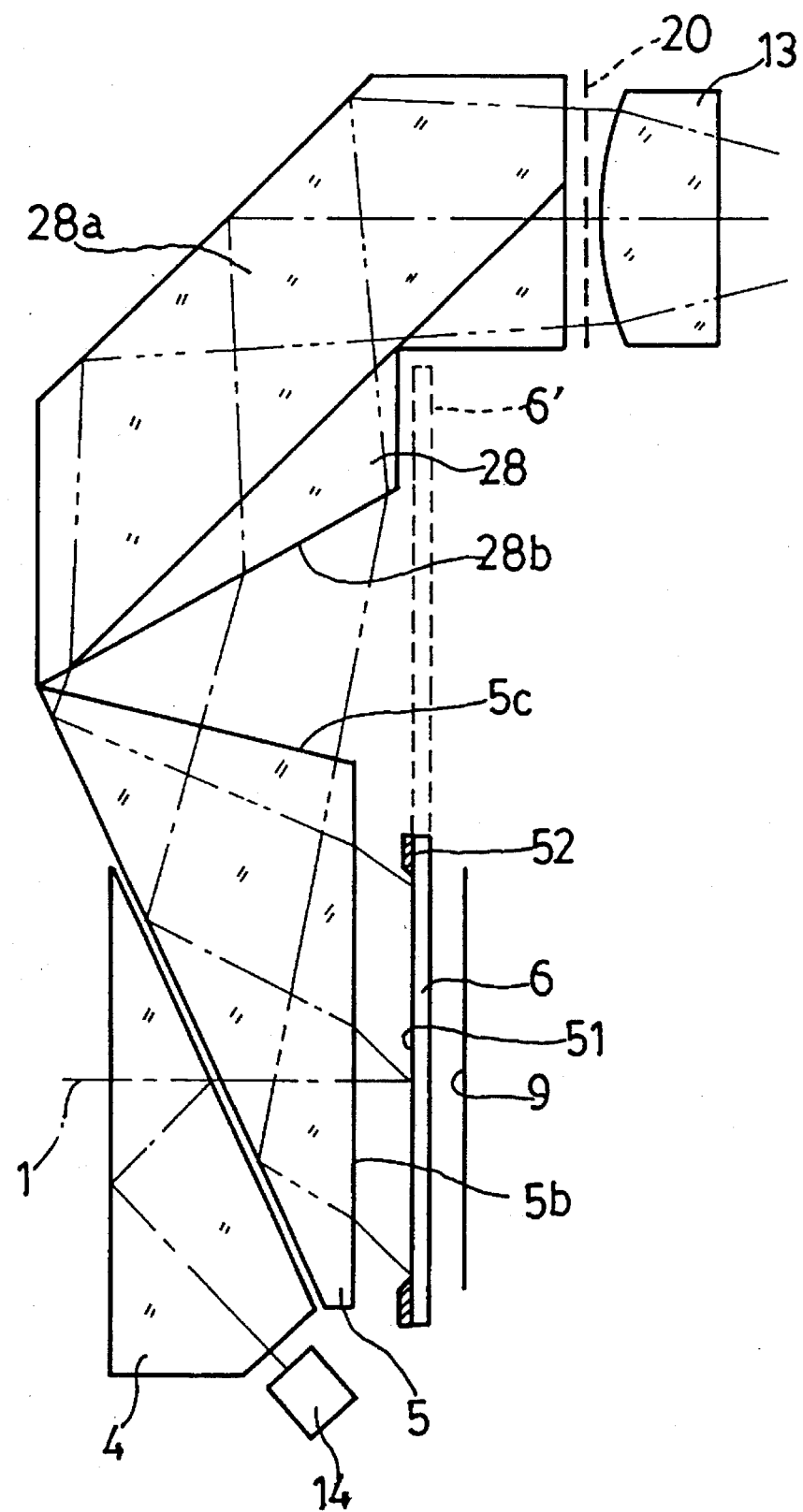
FIG. 11 is a cross-sectional view showing a single-lens reflex camera according to the sixth embodiment of the present invention.
Figure 32:
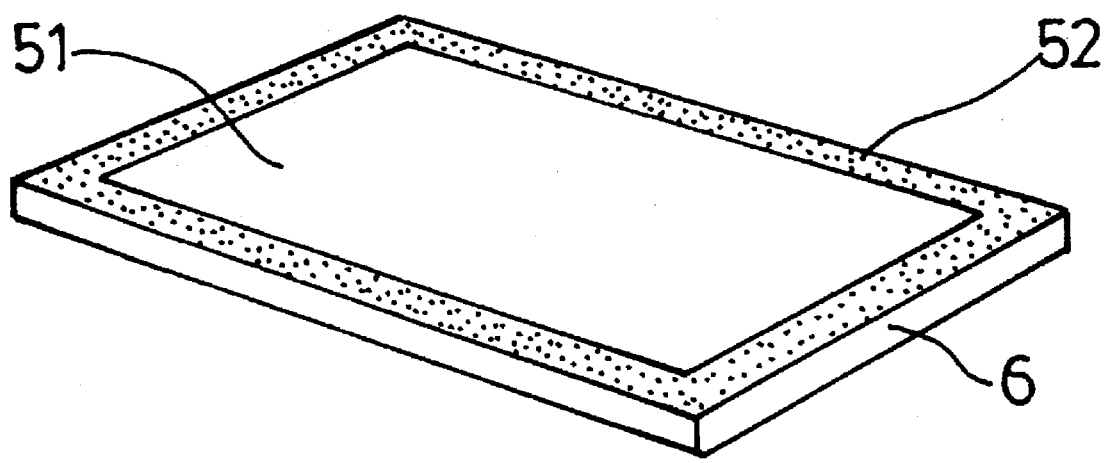
FIG. 32 is a general perspective view of a Fresnel mirror.

FIGS. 1, 11, and 32 shows an example that a visual field frame forming member 52 is arranged in the Fresnel mirror 6 to display the visual field frame within the viewfinder. Referring to FIGS. 1, 11, and 32, the visual field frame forming member 52 is arranged on the peripheral surface of the Fresnel function unit 51 of the Fresnel mirror 6.

The primary image of a camera object formed on the Fresnel mirror 6 by the photographing lens 3 can be clearly viewed as the visual field frame image, together with the camera object image. When the photographing lens 3 does not project the primary image of the camera object on the Fresnel mirror 6 (the primary image is projected near to the vertical plane of the second prism 5b in the photographing optical system), the distance adjusting capability of the naked eye can absorb the positional difference between the position of the visual field frame forming member 52 and the position of the camera object image.

In the embodiment shown in FIG. 1, like the camera object image, the field frame image can be seen as the secondary forming image from the relay lens 11 through the eyepiece 13. In the embodiment shown in FIG. 11, the visual field frame forming member 52 can be directly viewed through the eyepiece.

The visual field frame forming member 52 formed on the Fresnel mirror 6 is needed to be a pure black against the reflective light.

The ratio between the range where an image is actually photographed on the photosensitive surface 9 and the range viewed through the viewfinder visual field frame, or the visual field ratio, is 90 to 100% in the single-lens reflex camera. Thus, the internal dimension of the frame 52 formed by the visual field frame is about (22 to 22)×(33 to 36) mm².

Figure 3:
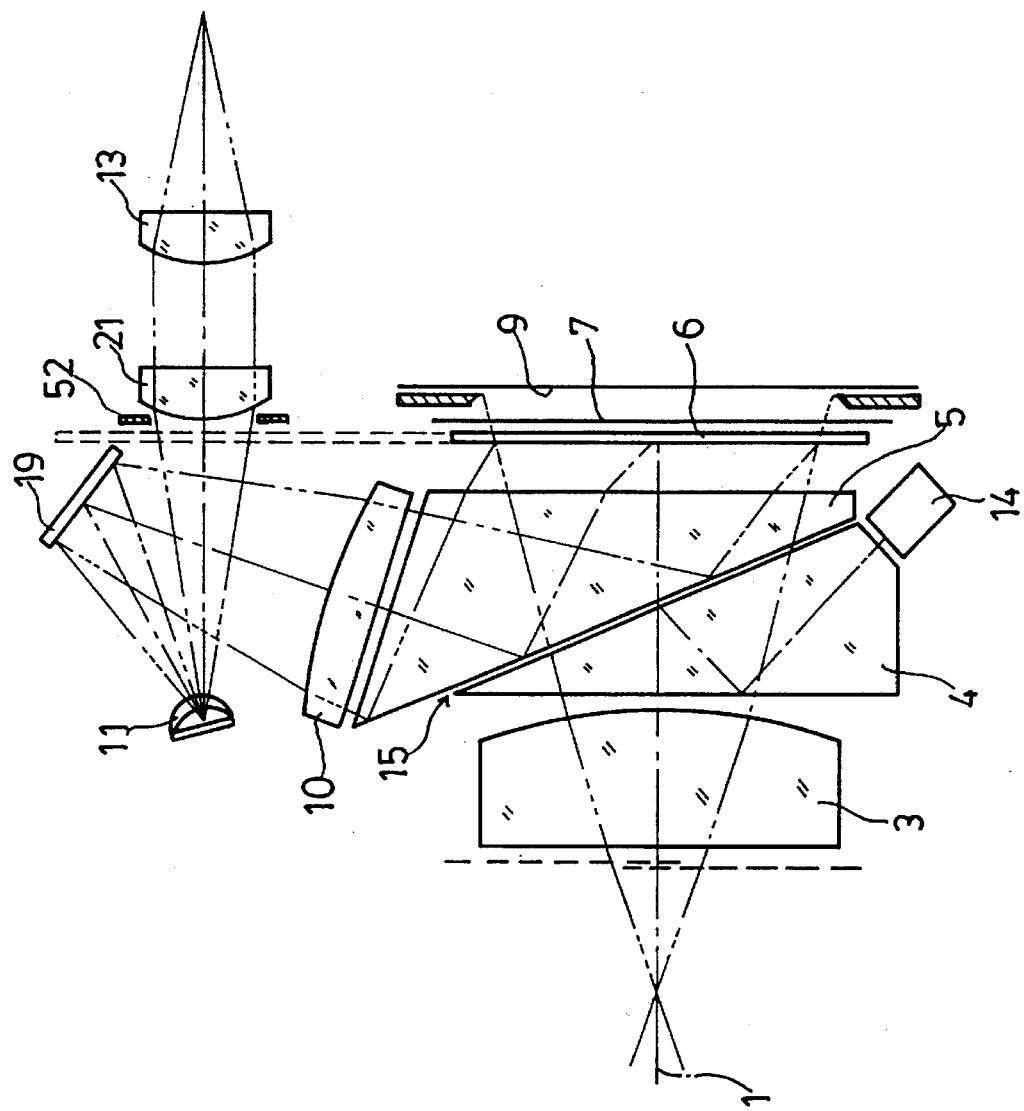
FIG. 3 is a cross-sectional view showing a single-lens reflex camera according to the second embodiment of the present invention.

FIG. 3 shows another example of a visual field frame display within the viewfinder. In this example, the visual field forming member 52 is arranged near to the secondary image forming plane or the field lens 21.

In this case, the camera object image is viewed as the secondary image formed by the relay lens 11 through the eyepiece 13, and the visual field frame image is viewed as the visual field frame forming member 52 through the eyepiece 13.

(11) In order to realize the so-called TTL system where the exposure amount adjustment or a focus adjustment to the photosensitive surface is automatically performed based on the information including the light bundle passing through the photographing lens, the fundamental optical element for forming the single-lens reflex, or the first prism 4 in the photographing optical system in the embodiment shown in FIG. 1, is used without any change. For example, the prism surface 4b without anti-reflection coating enables the reflection function by several percent to be effectively used as a beam splitter. A part of the light beam along the optical axis 1 of the photographing optical system is reflected on the prism surface 4b, is totally reflected on the prism surface 4a, passes through the prism 4c, and then enters the TTL light measuring sensor 14. Another TTL photo sensor facing the prism surface 4d can be arranged to receive light entering another portion of the image-plane.

(12) The employment of the lens shutter requires the following functions to various mechanism.

At a viewfinder observation time, the lens shutter diaphragm 2 is open; the iris diaphragm (not shown) is open; and the light bundle from the camera object reaches the Fresnel mirror 6. Hence the Fresnel mirror 6 is required to send the deflected and reflected flux to the viewfinder optical system and to shield flux from the photosensitive surface 9.

At a photographing time, the eyepiece shutter 20 invades the optical path of the viewfinder optical system to shut the light entering reversely from the eyepiece. After the light shielding operation has completed, the shutter diaphragm in open is once closed, and the Fresnel mirror 6 starts to withdraw from the optical path of the photographing optical system. The shutter diaphragm 2 once closed is re-closed after a predetermined exposure operation. After the Fresnel mirror 6 has covered the photosensitive surface 9 to restore the light shielding function, both the lens shutter diaphragm 2 and the eyepiece shutter 20 are opened.

The functions which are required to various structural elements in the first embodiment have been described above. Next another embodiment will be explained below.

The embodiment shown in FIG. 3 is different from the embodiment shown in FIG. 1 in the layout of the relay lens 11 in the viewfinder optical system. The reflex-type relay lens 11 is arranged at the corresponding position where the reflex-type field lens 12 in the embodiment shown in FIG. 1. A mirror 19 is added and a transparent-type field lens 21 is arranged in front of the eyepiece 13.

The condenser lens 10 forms the exit pupil image of the photographing lens near to the pupil position of the reflective relay lens 11. Hence in the embodiment shown in FIG. 3, the condenser lens has a weaker converging function than that in the embodiment shown in FIG. 1.

Figure 7:
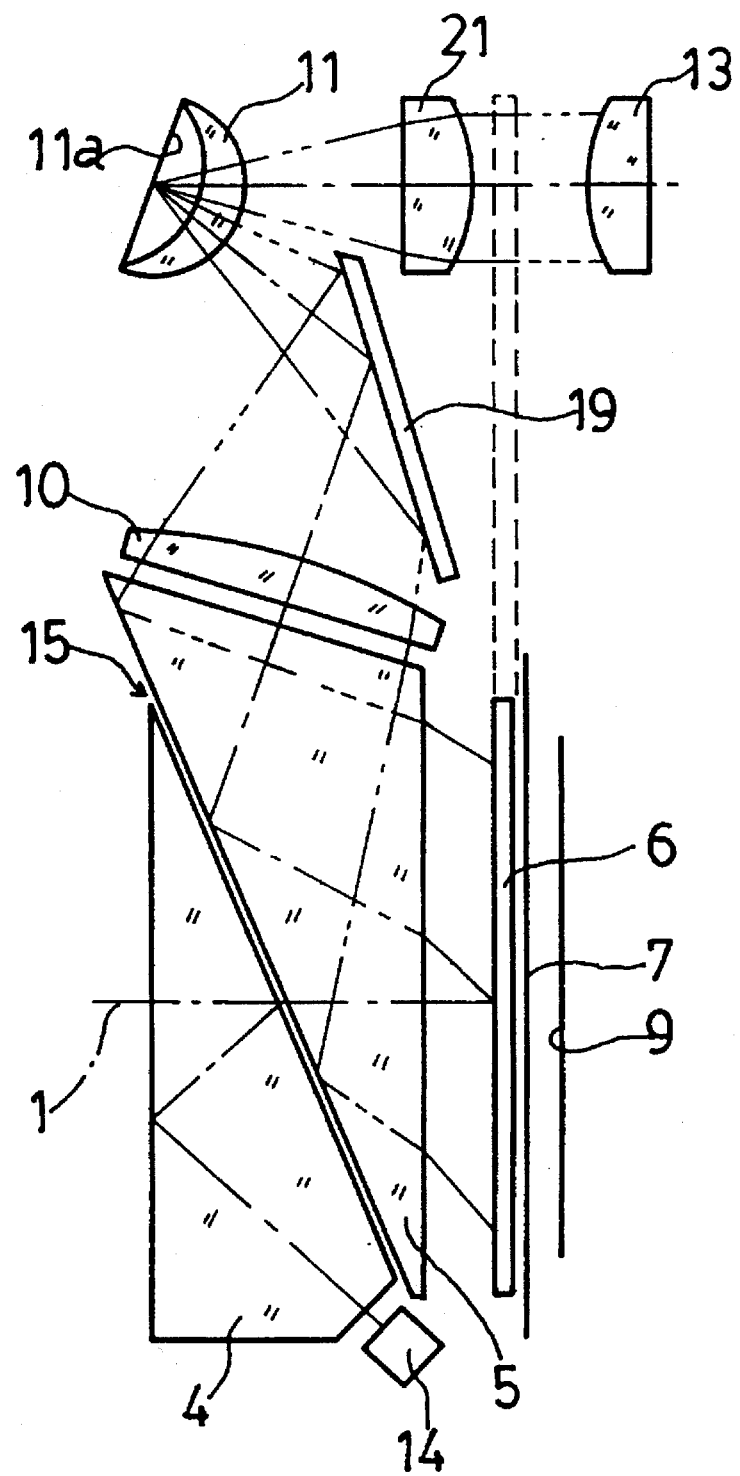
FIG. 7 is a cross-sectional view showing a single-lens reflex camera according to the third embodiment of the present invention.
Figure 8:
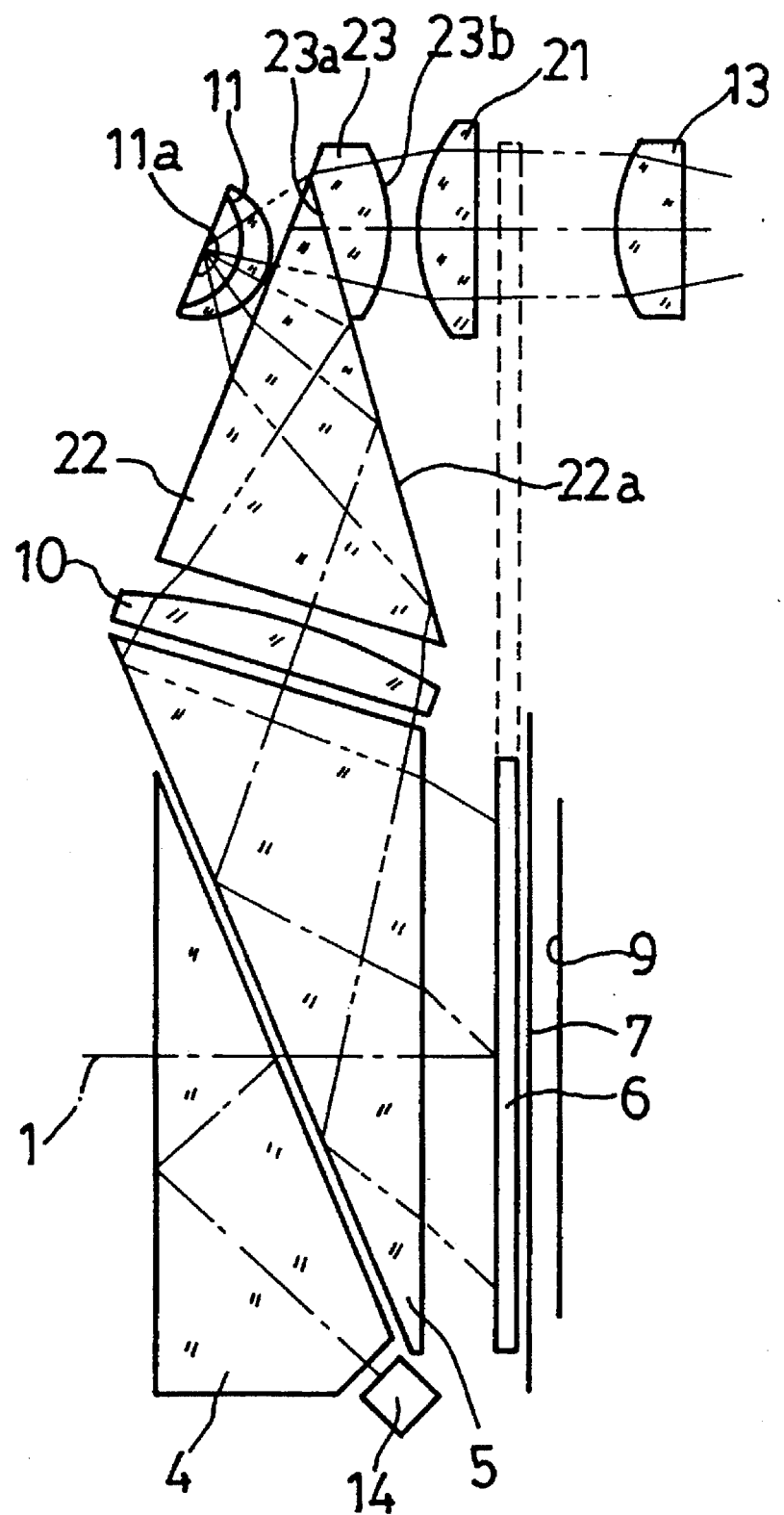
FIG. 8 is a cross-sectional view showing a single-lens reflex camera according to the fourth embodiment of the present invention.

According to the embodiments in FIGS. 1 and 3, the optical path in the viewfinder optical system is figured in numeral "4", like the optical path in the pentagonal prism. In the embodiments in FIGS. 7 and 8, the optical path in the viewfinder optical system is figured in letter "Z". In the embodiment shown in FIG. 7, the Z-shape optical path is formed of the mirror 19 and the reflex-type relay lens 11. In the embodiment shown in FIG. 8, the Z-shaped optical path is formed of the viewfinder prism 22, the viewfinder auxiliary prism 23, and the reflex-type relay lens 11. A low refractive index material layer such as air may be filled between the prism surface 22a and the prism surface 23a. In the embodiment shown in FIG. 8, the rear surface 23b of the prism 23 may be a part of spherical surface to share the function of the field lens. However, by strengthening its light converging capability of the field lens 21, the prism 23b may make a flat surface. The embodiment shown in FIG. 9 shows a viewfinder optical system in which the cylindrical relay lens 24 and cylindrical view field lens 25 lead the right viewfinder image in side to side and upside down to the photographer.

Figure 9:
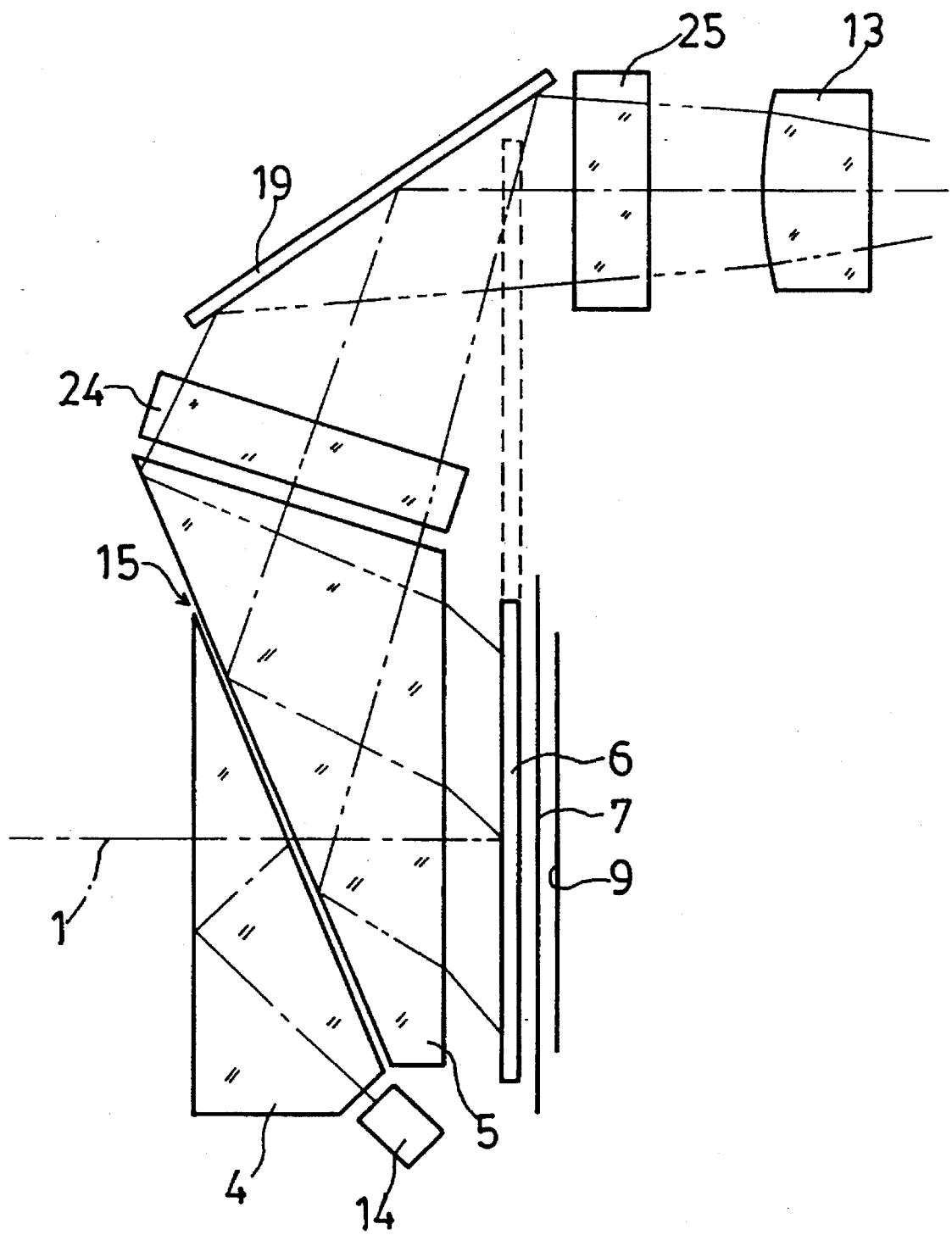
FIG. 9 is a cross-sectional view showing a single-lens reflex camera according to the fifth embodiment of the present invention.

In the embodiment shown in FIG. 9, the layout of the prisms 4 and 5 is equivalent to those of the embodiments in FIGS. 1, 3, 7, and 8.

The Fresnel mirror 6 is arranged between the prisms 5 and the photo-sensitive material 9, like the embodiments in FIGS. 1, 3, 7, and 8, but differs in the function (to be described later). The cylindrical relay lens 24 is arranged above the prism 5. The mirror 19 is arranged to reflect substantially horizontally the light bundle beaming above the cylindrical relay lens 24. The cylindrical field lens 25 is arranged behind the mirror 19 and the eyepiece 13 is arranged behind the cylindrical field lens 25.

Figure 10:
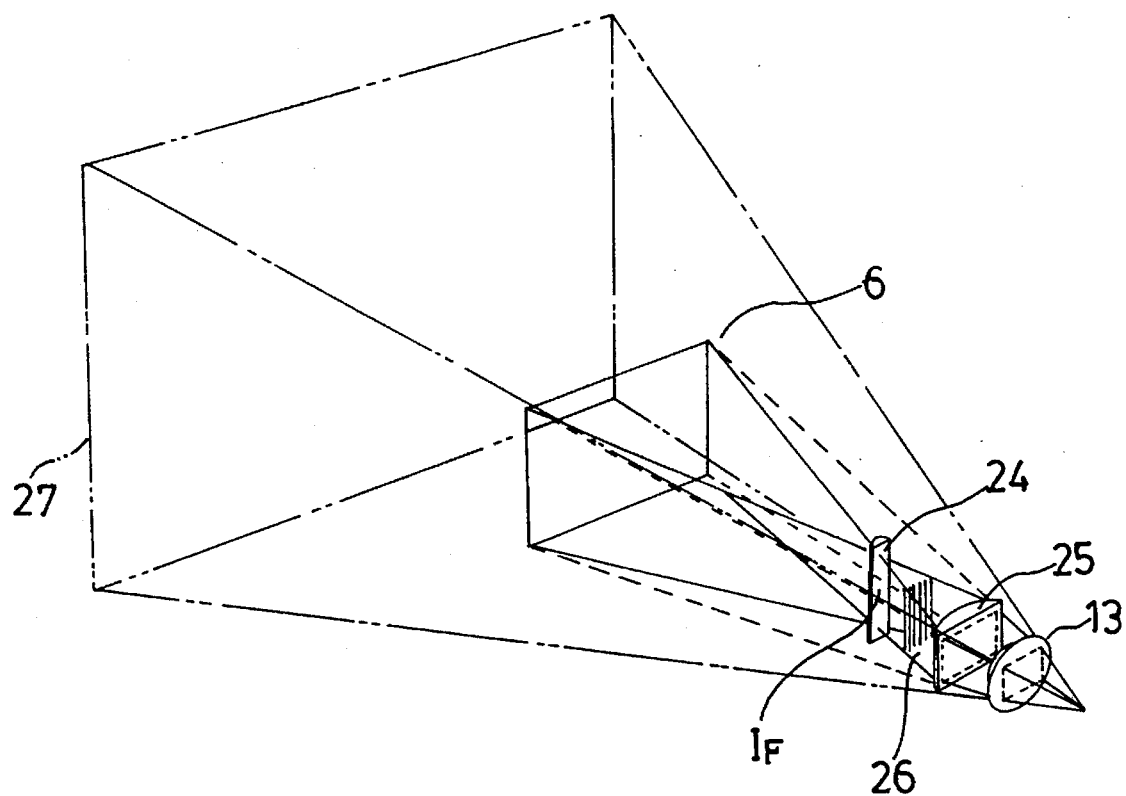
FIG. 10 is a model diagram showing the viewfinder optical system of the single-lens reflex camera according to the fifth embodiment of the present invention.

FIG. 10 is a model diagram showing the viewfinder optical system in the embodiment shown in FIG. 9, (but the mirror 19 is not drawn).

The light bundle deflected and reflected by the Fresnel mirror 6 makes a camera object image formed by the photographing lens 3 immediately near to the Fresnel mirror 6. The flux also is horizontally subjected to a strong converging effect to form an exit pupil image of the photographing lens projected near to the pupil TF of the elongated cylindrical lens 24. The light bundle passing through the cylindrical relay lens 24 forms the secondary image 26 between the cylindrical relay lens 24 and the field lens 25. The secondary formed image 26 is an image formed of only the vertical component of the image. The horizontal component does not contribute the image formation. The cylindrical field lens 25 forms the virtual image of the secondary forming image 26 formed of the vertical component near to the Fresnel mirror (at the primary image forming position) 6, and corrects the light bundle to the original image aspect ratio. The photographer can view the correct viewfinder image through the eyepiece 13. That is, the vertical component viewfinder image 27 is viewed as the secondary image 26 formed by the cylindrical relay lens 22 at the corresponding position of the primary image through the cylindrical field lens 25. The photographer can clearly observe the vertical and horizontal image components.

Figure 22:
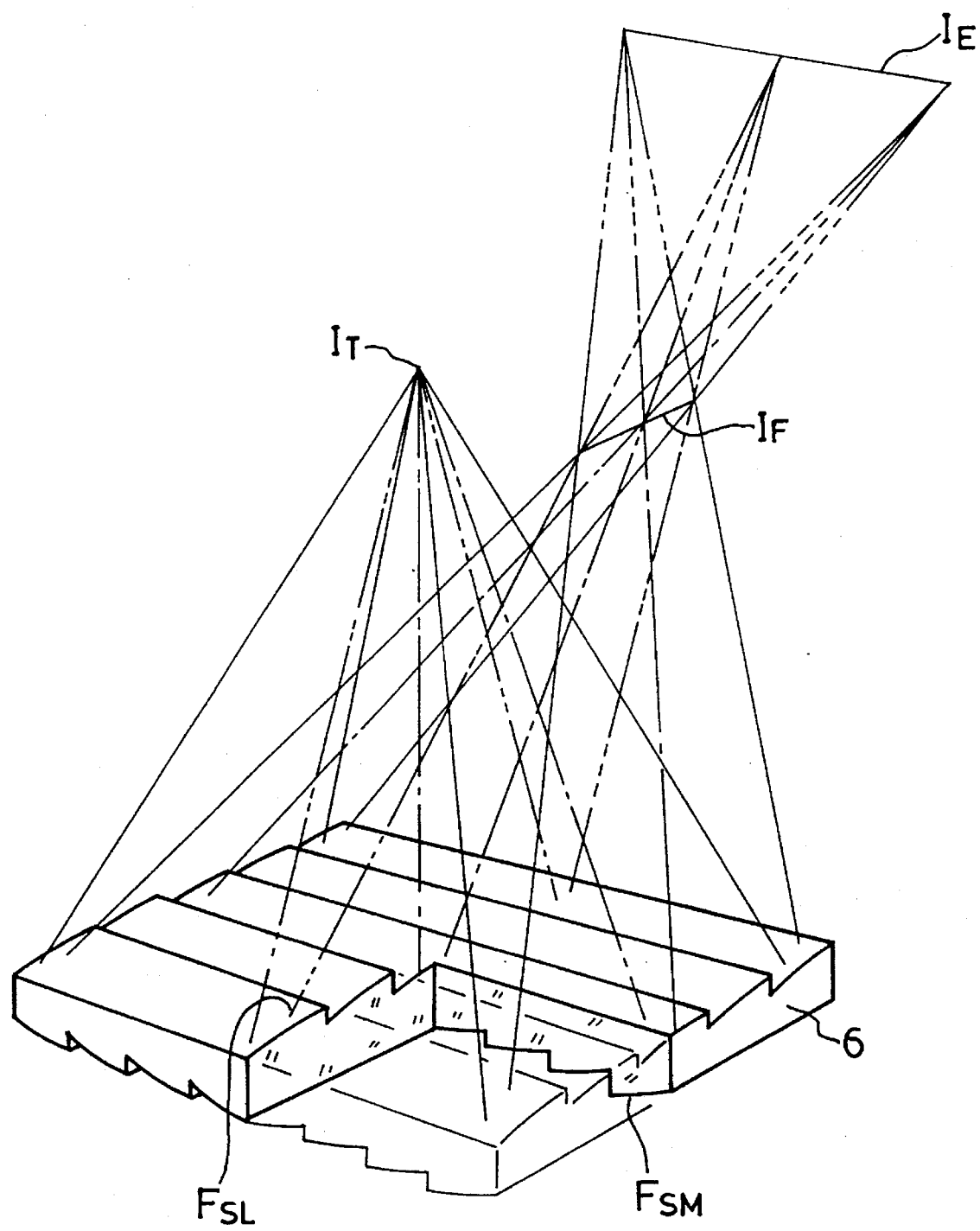
FIG. 22 is a perspective cross-sectional view showing a Fresnel mirror according to the third embodiment of the present invention.
Figure 23:
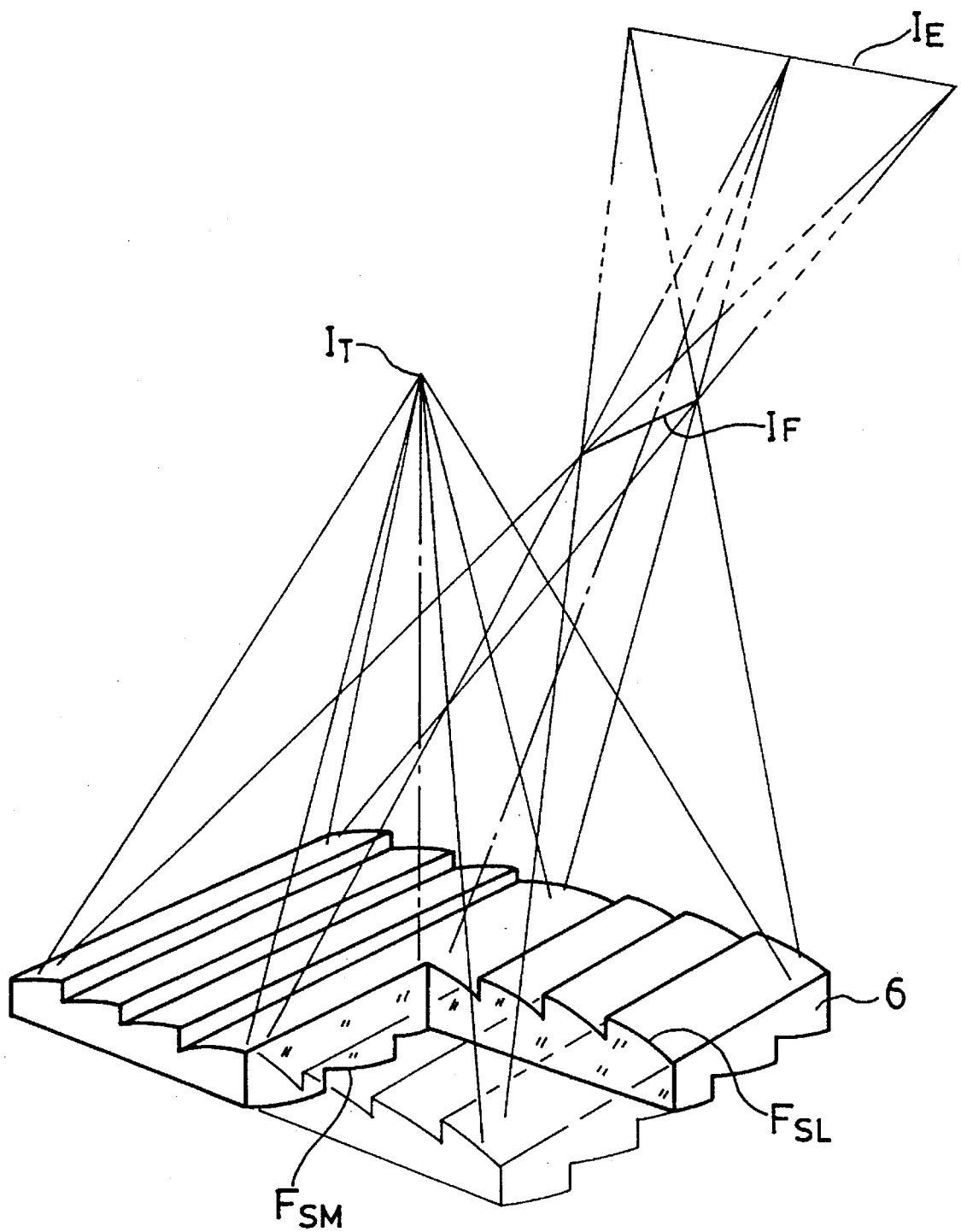
FIG. 23 a perspective cross-sectional view showing a Fresnel mirror according to the fourth embodiment of the present invention.

A Fresnel mirror with astigmatism aberration is needed in order to realize the present viewfinder optical system using the cylindrical lens. FIGS. 22 and 23 is a model diagram showing examples of the Fresnel mirror.

In the examples shown in FIGS. 5 and 6, the concentrically engraved Fresnel lens or mirror shares the light condensing function and the striped Fresnel prism or mirror shares the-deflecting function. In the embodiments shown in FIGS. 22 and 23, there is a difference between the focus point by the cylindrical Fresnel lens portion FSL engraved on the front surface in stripe form and the focus point by the cylindrical Fresnel mirror portion FSM engraved on the rear surface perpendicularly to the stripe form. Thus a Fresnel mirror with astigmatism aberration is made by producing a difference in strength between the vertical condensing function and the horizontal condensing function.

In the embodiment shown in FIG. 22, the cylindrical Fresnel lens shape FSL on the front surface shares the deflecting and refracting function and the weak vertical condensing and refracting function. The cylindrical Fresnel lens shape FSM on the rear surface shares the deflecting and reflecting function and the weak vertical condensing and reflecting function.

In the embodiment shown in FIG. 23, the cylindrical Fresnel lens shape FM on the front surface shares the strong horizontal condensing and refracting function. The cylindrical Fresnel lens shape FSM on the rear surface shares the deflecting and reflecting function and the weak vertical condensing and reflecting function.

Each of the Fresnel mirrors shown in FIGS. 22 and 23 forms an image of the exit pupil IT of the photographing lens 3 at the position of the pupil IF of the cylindrical relay lens and at the position of the pupil IE of an naked eye of the photographer behind the viewfinder optical system.

The Fresnel cylindrical optical elements with the same focus distance formed on the front and rear surfaces can perform the function which is equivalent to the Fresnel mirror in the embodiments shown in FIGS. 5 and 6. The above structure is applicable to single-lens reflex systems other than the embodiment shown in FIG. 9.

In the embodiment shown in FIG. 11, the roof prism 28 is arranged above the second prism 5 in the photographing optical system to reflect the light bundle beaming up from the prism surface 5c substantially horizontally and backward, with two surfaces crossing perpendicularly to each other. The roof prism surface 28a reverses horizontally the image so that the photographer can horizontally observe a right viewfinder image.

In the present embodiment, the lower surface 28b of the prism 28 is tilted backward to refract vertically the light bundle beaming up backward and slantingly (on the photographer side) from the prism surface 5c. Thus at the photographing time, the Fresnel mirror 6 secures a space 6' for retreating from the optical path in the photographing optical system.

Figure 12:
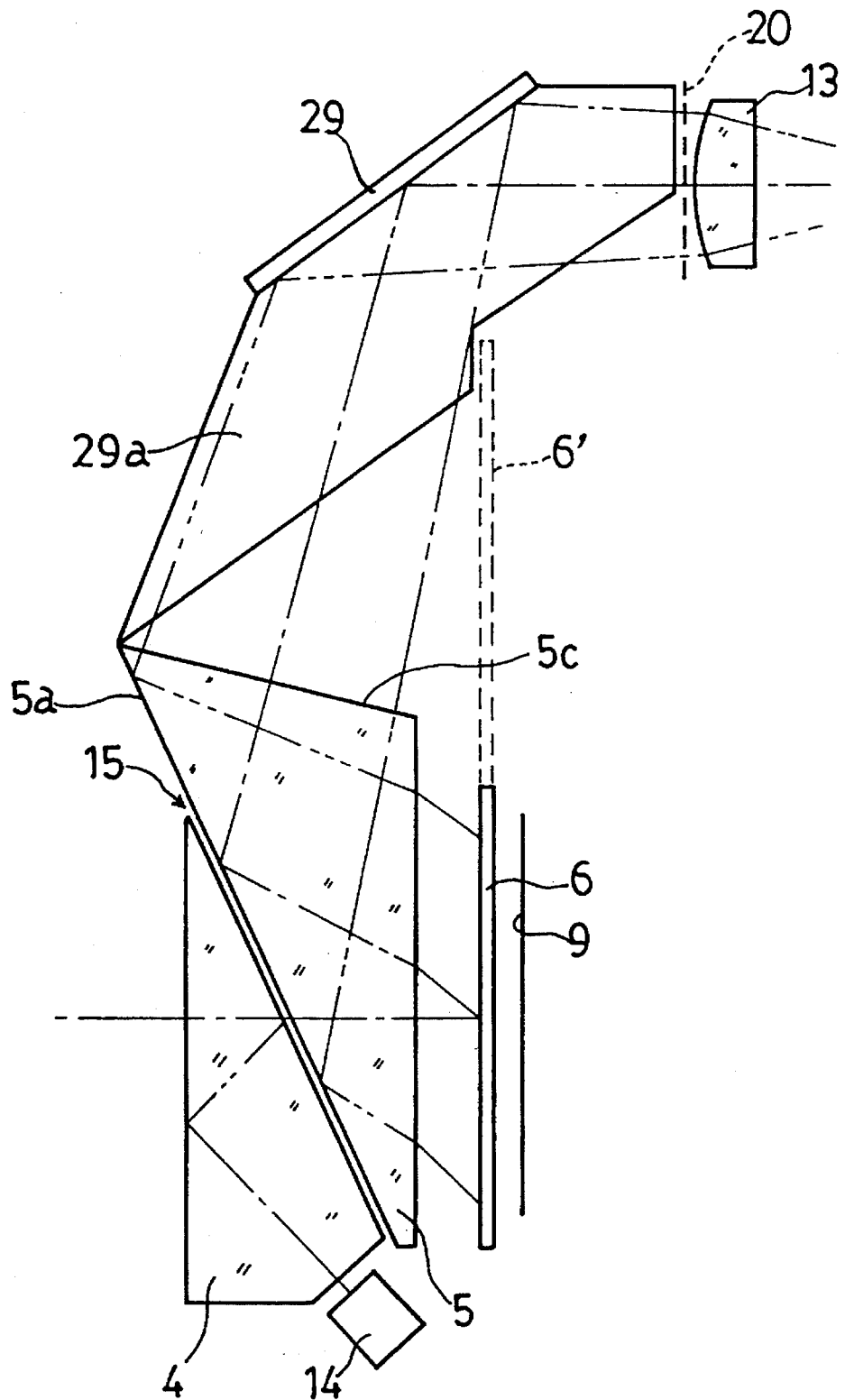
FIG. 12 is a cross-sectional view showing a single-lens reflex camera according to the seventh embodiment of the present invention.
Figure 29:
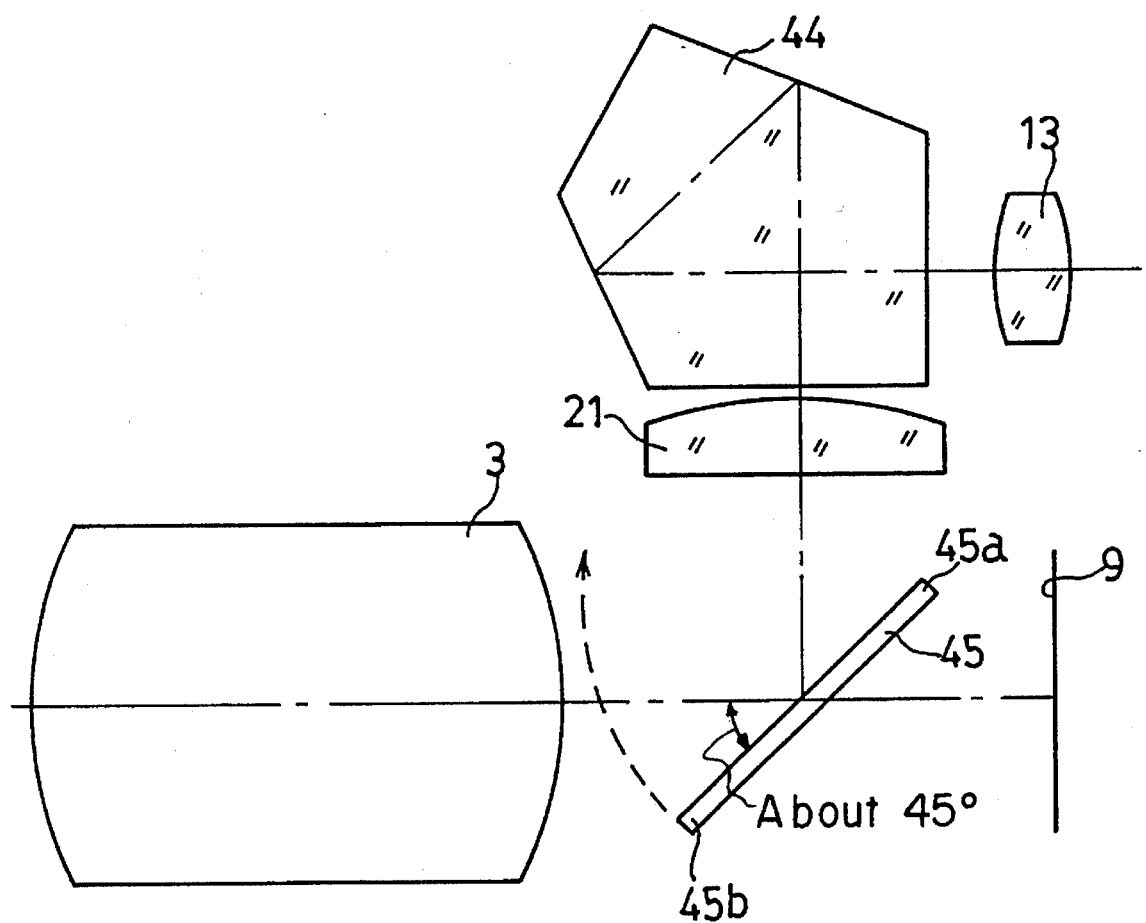
FIG. 29 is a cross-sectional view showing the optical path of a conventional single-lens reflex camera.

In the embodiment shown in FIG. 12, the mirror 29 is arranged above the prism 5 to reflect the light bundle rising from the prism surface 5c substantially horizontally and backward. The surface 29a of the roof mirror with two planes crossed reverses an image from side to side so that a photographer can view a viewfinder image corrected horizontally. In the embodiment shown in FIGS. 11 and 12, the prism is higher than those in the embodiments shown in FIGS. 3, 7, 8, and 9. However, the height is equal to or slightly lower than that of the pentagonal prism of the conventional single-lens reflex camera shown in FIG. 29.

In the embodiments shown in FIGS. 9, 11, and 12, the light bundle reflected perfectly on the slant surface 5a of the prism 5 is a weak converging light bundle in nearly parallel. Hence it is not needed to arrange the condenser lens for making a parallel light bundle.

In the embodiments shown in FIGS. 11 and 12, the light bundle rising from the upper surface 5c of the prism 5 is guided to the eyepiece 13 via the roof prism 28 and the roof mirror 29. In the embodiment 13 shown in FIG. 13, the light bundle is perfectly reflected on the rear surface 22a of the viewfinder prism 22 forward (on the camera object side), slantingly and upward. The flux is perfectly re-reflected on the upper surface 22b of the viewfinder prism 22 upward (camera object side), slantingly, and downward to send to the roof prism 28. The image is reversed on the roof surface 28a from side to side while it is reflected backward (on the photographer side). The flux is guided to eyepiece 13 by way of the viewfinder prism 22.

Figure 13:
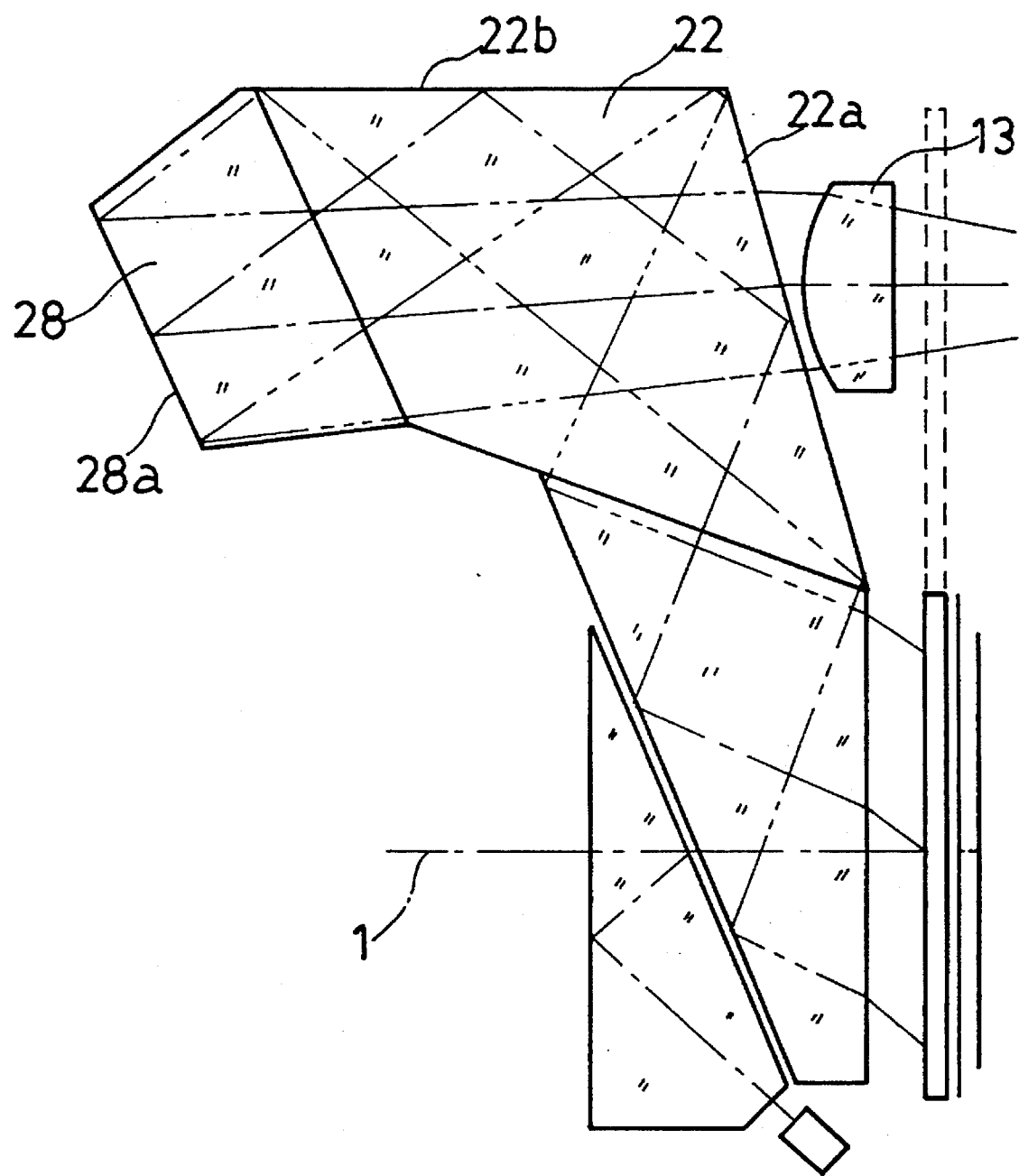
FIG. 13 is a cross-sectional view showing a single-lens reflex camera according to the eighth embodiment of the present invention.

Like the embodiment shown in FIG. 12, this method allows the photographer to observe directly the image produced by the photographing lens 3. This method has an advantage in that the prism is somewhat bulky but low in height. In FIG. 13, when a photographer's eye observing a viewfinder image is somewhat downward to the optical axis in the photographing optical system, the optical path of the light bundle from the roof prism surface 28a to the eyepiece 13 can be further slanted upward and in the right direction.

Figure 14:
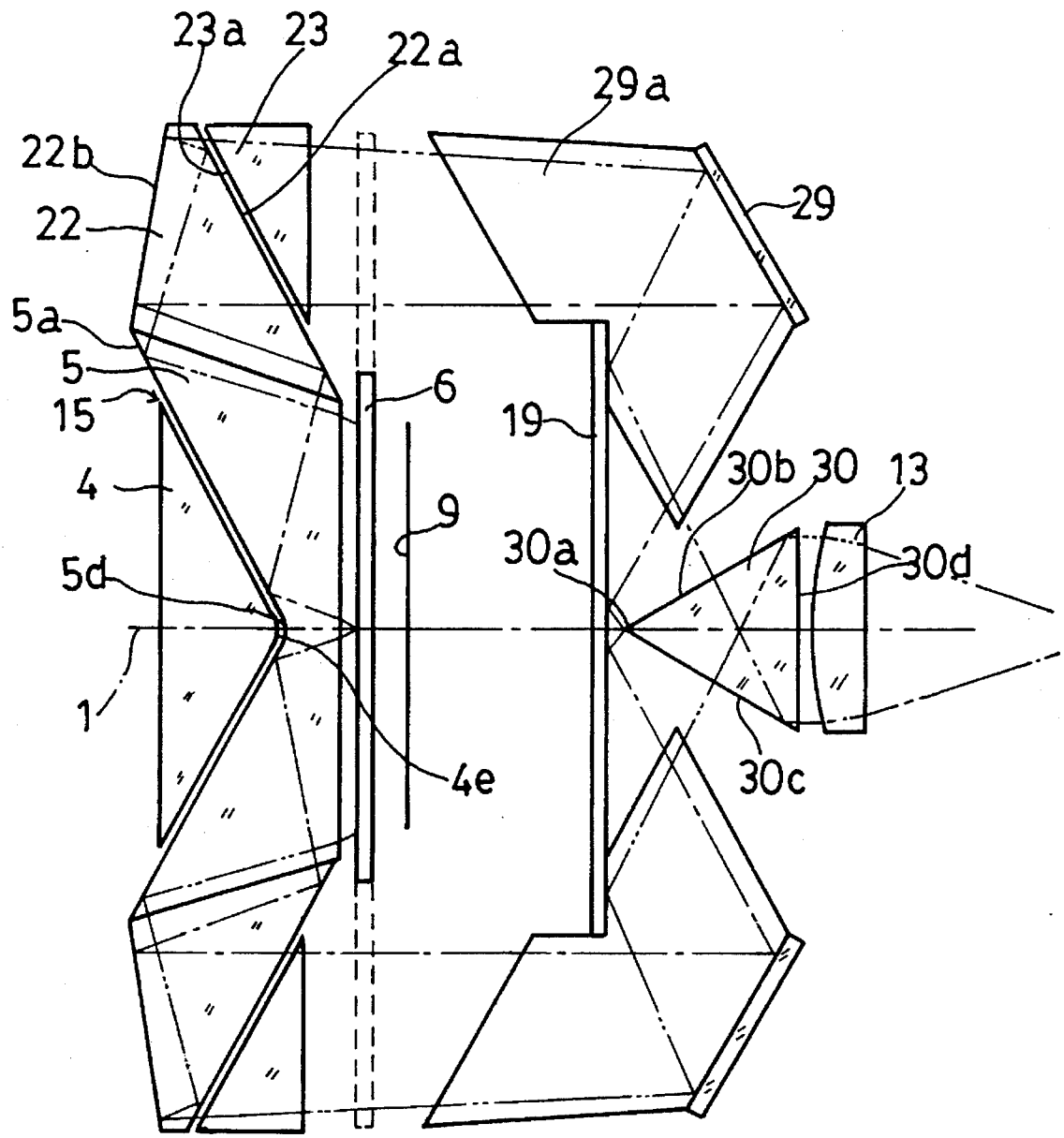
FIG. 14 is a cross-sectional view showing a single-lens reflex camera according to the ninth embodiment of the present invention.

The embodiment shown in FIG. 14 shows a method for directly observing an image produced by the photographing lens. This method has an advantage in that the lens back of the photographing lens 3 can be shortened to the utmost limit. In order to shorten the lens back, the image produced by the photographing lens 3 is separated to the upper side and the lower side. The light bundlees pass separately through the optical paths in the viewfinder optical system arranged vertically to and behind the camera body mechanism. The light bundlees are combined within the image synthesis prism 30 arranged along and behind the optical axis in the photographing optical system to observe as a single image on the eyepiece 13. The viewfinder optical systems are symmetrically arranged on the upper and lower sides of the camera body.

Half of the upper portion of the Fresnel mirror 6 deflects and reflects the half of the upper portion of an image produced by the photographing lens forward (on the camera object side) and slantingly upward. Half of the lower portion of the Fresnel mirror 6 deflects and reflects the half of the lower portion of the produced image forward (on the camera object side) and slantingly downward. In the Fresnel mirror 6, the deflecting and reflecting Fresnel structure on the half of the upper portion is reversely and symmetrical to that of the half of the lower portion. The Fresnel mirror 6 is split at its nearly center portion at a photographing time and the split portions are retreated vertically separately from the optical path in the photographing optical system. At a viewfinder observation time, the Fresnel mirror 6 is closed with the ends of the upper and lower split portions being in contact with each other.

In the case of the lens shutter, the Fresnel mirror 6 acting as a light shielding plate has a perfect light shielding structure formed of an upper recessed contact portion and a lower projected contact portion. There is a derivative effect that splitting the Fresnel mirror 6 to the upper portion and the lower portion can cancel the impact occurring when the split portions retreat from the optical path in the photographing optical system.

In other embodiments each having a structure that an image is not split in two, the Fresnel mirror 6 may be divided. When the Fresnel mirror is split vertically and retrieved from the photographing optical system at a photographing time, arranging means for limiting the Fresnel mirror retrieving stroke to cover the upper and lower portions of the photosensitive surface 9 allows taking a different size photograph such as a panorama size photograph.

The light bundle deflected and reflected by the Fresnel mirror 6 re-enters the prism 5. The prism surface 5a reflects perfectly the flux back to the viewfinder prism 22 and then the prism 22a reflects totally it forward. Then the mirror-processed prism surface 22b reflects the flux back to the Dach (roof shaped) mirror 29 via the viewfinder auxiliary prism 23.

The roof mirror 29 with the Dach mirror surfaces 29a perpendicular to each other reverses the image from side to side while it reflects the light bundle toward the planar mirror 19. The light bundle taken out of the photographing optical axis enters the planar mirror 19 with an incident angle of 60°.

The planar mirror 19 reflects the light beam with an reflective angle of 60° to guide it to the vertex point 30a of the image synthesis prism 30 with a regular triangle cross section. The light bundle falling downward enters the prism surface 30b of the image synthesis prism 30. Then the prism surface 30c totally reflects the flux toward the eyepiece 13 from the prism surface 30c. The photographer can view a combined viewfinder image through the eyepiece 13.

With the use of the present viewfinder light bundle splitting method, the lens back can be suppressed to a stroke of 12 to 12 mm. Moreover the effective optical dimension is largely reduced to about 9 mm, by subtracting by the optical path extension (Nd−1)/Nd of the BK7 glass made prism. of 8 to 10 mm thick. This feature can largely relieve the requirements imposed on the compact camera design, and lens design, particularly, wide-angle series zoom lens design.

In FIG. 14, a low refractive index material layer 15 such as air separates the apex portion 4e of the first prism 4 in the photographing optical system from the middle recessed portion of the second prism 5 in the photographing optical system. The low refractive index material layer 15 with equal thickness does not affects the image on the photosensitive surface and has a curved cross section such as an arc cross section. The low refractive index layer 15 is not so thin as to produce an interference fringe but is not thick as to produce an aberration.

In order to totally reflect the light bundle zooming from the prism 5 in the photographing optical system, it is needed that a low refractive index material layer such as air separates the viewfinder auxiliary prism 23 from the prism surface 23a.

On the other hand, the second prism 5 in the photographing optical system may be separated from the viewfinder prism 22. Because of no need of the total reflection, a low refractive index material layer may be intervened at the boundary surface between the second prism 5 and the viewfinder prism 22. The second prism 5 and the viewfinder prism 22 may be adhered or made as one piece.

In the embodiment shown in FIG. 14, a roof prism 29 may be used instead of the roof mirror employed to reverse the viewfinder light bundle from side to side.

In the embodiments shown in FIGS. 1, 3, 7, 8, 9, 11, 12, 13, and 14, the optical axis in the viewfinder optical system lies in the same plane as the optical axis in the photographing optical system. In the embodiments described hereinafter, a part of the optical axis in the viewfinder optical system does not exist on the plane surface including the optical axis 1 in the photographing system.

Here explanation will be made as for an optical reflection frequency in the optical system. In addition to the conventional viewfinder optical system, it is fundamentally needed that the optical reflection occurs even number of times in the entire optical system to form a right erect viewfinder image. In the conventional single-lens reflex camera, reflection occurs four times: once by the mirror and three times by the pentagonal roof prism acting as a viewfinder optical system.

In the optical system of the present invention, it is needed that reflection occurs even number of times in the viewfinder optical system because the reflection occurs twice in the optical path in the photographing optical system.

In the embodiments shown in FIGS. 1, 3, 7, 8, 11, and 12, the reflection occurs twice in the viewfinder optical system. In the embodiment shown in FIG. 13, the reflection occurs four times in the viewfinder optical system. In the embodiment shown in FIG. 14, the reflection occurs eight times in the viewfinder optical system. In the embodiment shown in FIG. 9, the cylindrical lens reverse the image from side to side, so reflection occurs only once in viewfinder system.

In order to form vertically and horizontally a correct viewfinder image, the light bundle is reflected four times, regardless of the presence or absence of the relay lens, in the viewfinder optical system where a part of the optical axis in the viewfinder optical system does not lie in the plane including the optical axis in the photographing optical system. Hence the light bundle is reflected six times in total because the light bundle is reflected twice in the photographing optical system.

FIGS. 15, 16, 17, and 34 show the embodiment of a structure including the relay lens 31 in the viewfinder optical system. The condenser lens 10 is arranged adjacent to the upper surface 5c of the second prism 5 in the photographing optical system to reflect totally on the slant prism surface 5a of the second prism 5 in the photographing system and to convert the light bundle passing through the second prism 5 in the photographing optical system into a parallel light bundle. This structure is similar to those in the embodiments shown in FIGS. 1, 3, 7, and 8. The first prism 4 in the photographing optical system, the second prism 5 in the photographing optical system, and the Fresnel mirror 6 are similar to those in the embodiments shown in FIGS. 1, 3, 7, and 8.

Therefore, the optical path, where the light bundle passes from the photographing lens 3 to the condenser lens 10 via the first prism 4 in the photographing optical system, the second prism 5, the Fresnel mirror 6, and the second prism 5, is similar to those shown in FIGS. 1, 3, 7, and 8.

First, the embodiment shown in FIG. 15 will be described below. The converging light bundle sent upward and slightly backward (on the photographer side) from the condenser lens 10 enters the roof mirror 29, and reflects it horizontally. At the same time, the roof mirror surface reverses the front and rear portions of the light bundle (the upper portion and lower portion of the image). Then the light bundle enters the relay lens 31 and is reflected on the mirror 19. The light bundle ascends in parallel with the optical axis in the viewfinder optical system between the condenser lens 10 and the roof mirror 29 to form the secondary image near to the field lens 21. The photographer can observe the secondary image corrected vertically and horizontally as a viewfinder image through the mirror 32 and the eyepiece 13.

Figure 15:
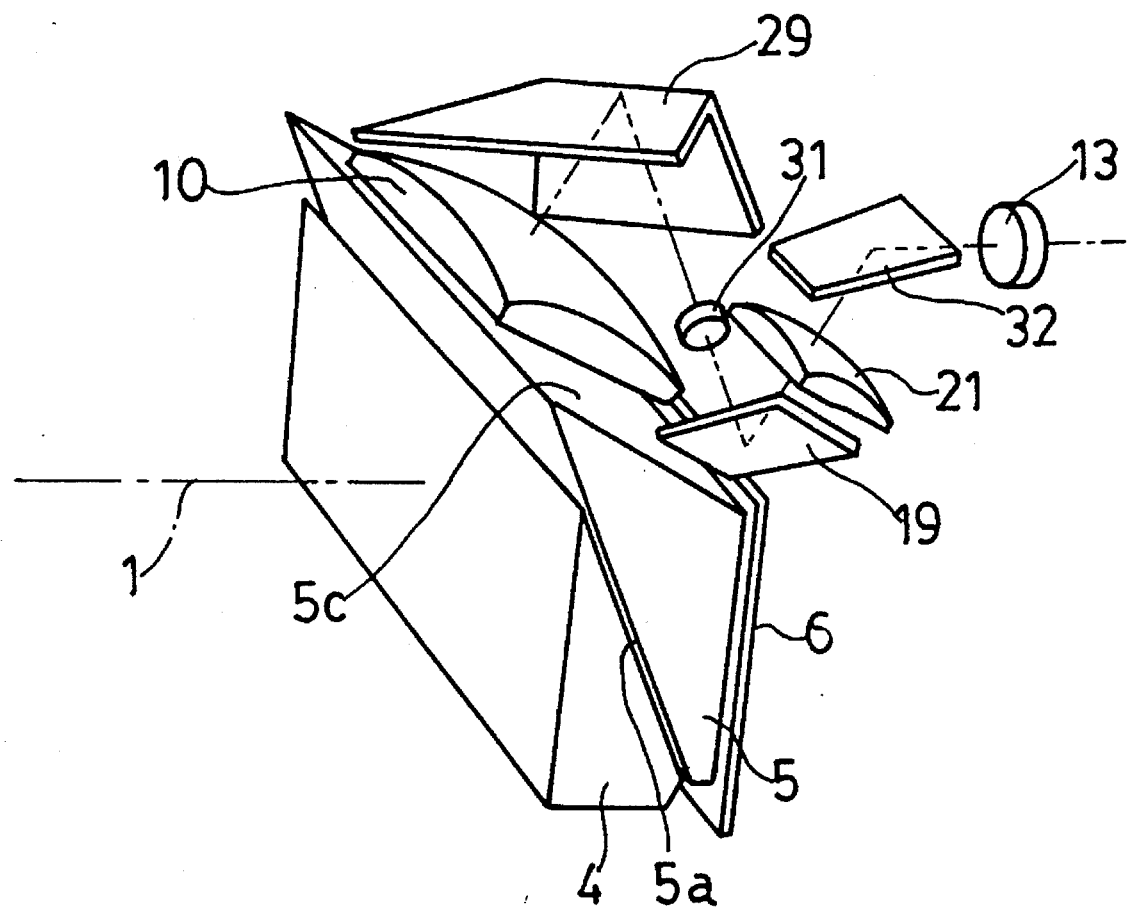
FIG. 15 is a cross-sectional view showing a single-lens reflex camera according to the tenth embodiment of the present invention.
Figure 16:
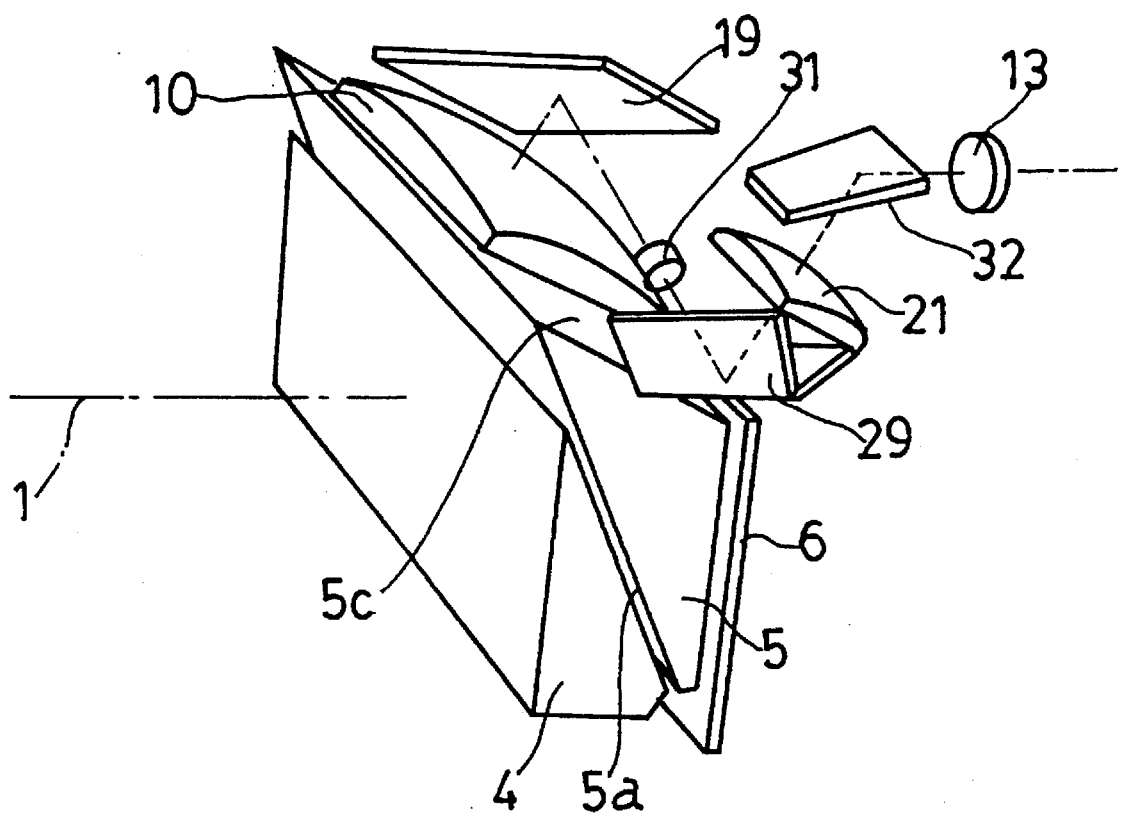
FIG. 16 is a cross-sectional view showing a single-lens reflex camera according to the eleventh embodiment of the present invention.

The embodiment shown in FIG. 16 is different from that shown in FIG. 15 in that the plane mirror 19 is arranged in place of the roof mirror 29.

In the embodiments shown in FIGS. 15 and 16, the roof mirror 29, the mirror 19, and the eye mirror 32 are used as the reflex optical element. However, a total reflection-type prism or a mirror-processed prism may be used as the reflective optical element. At the same time substituting the prism, shaping the prism surface in a spherical surface allows omitting the condenser lens 10 or the field lens 21 and moderating power.

The relay lens 31 and the plane mirror 19 may be combined to as the same type relay lens as the reflex relay lens described in the item (8) in bodiment shown in FIG. 1.

Figure 34:
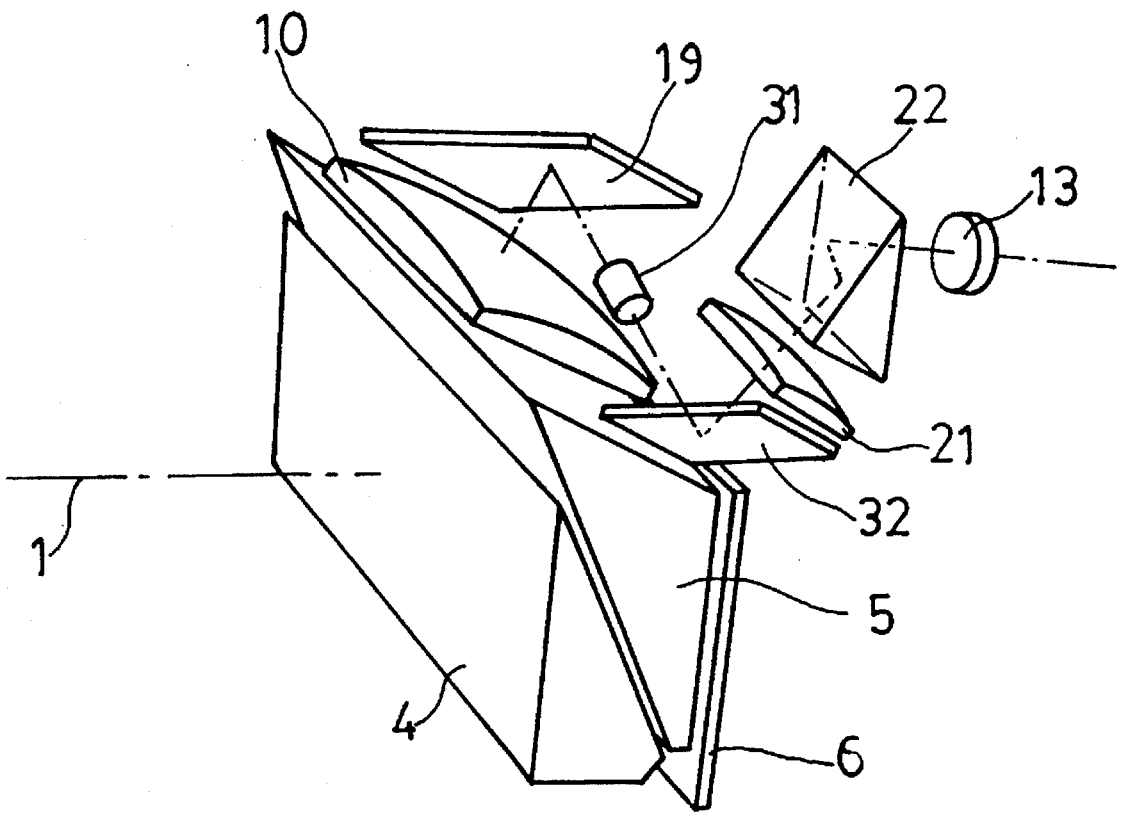
FIG. 34 is a perspective view showing a single-lens reflex camera according to the seventeenth embodiment of the present invention.

In the embodiment shown in FIG. 34, the light bundle in the secondary image forming optical system is reflected by the plane mirrors 19 and 32, and the triangle prism 22 arranged in the secondary image observation optical system reflects twice the light bundle. The number of reflection in the entire system is adjusted to six times (even number of times).

In the embodiments shown in FIGS. 15, 16, and 34, the optical path in the viewfinder optical system is figured in "N" shaped path, viewed from the front side of the camera (on the camera object side). However, the embodiment shown in FIG. 17 may be figured in "L" shaped path, viewed from the front side of the camera (on the camera object side).

Figure 17:
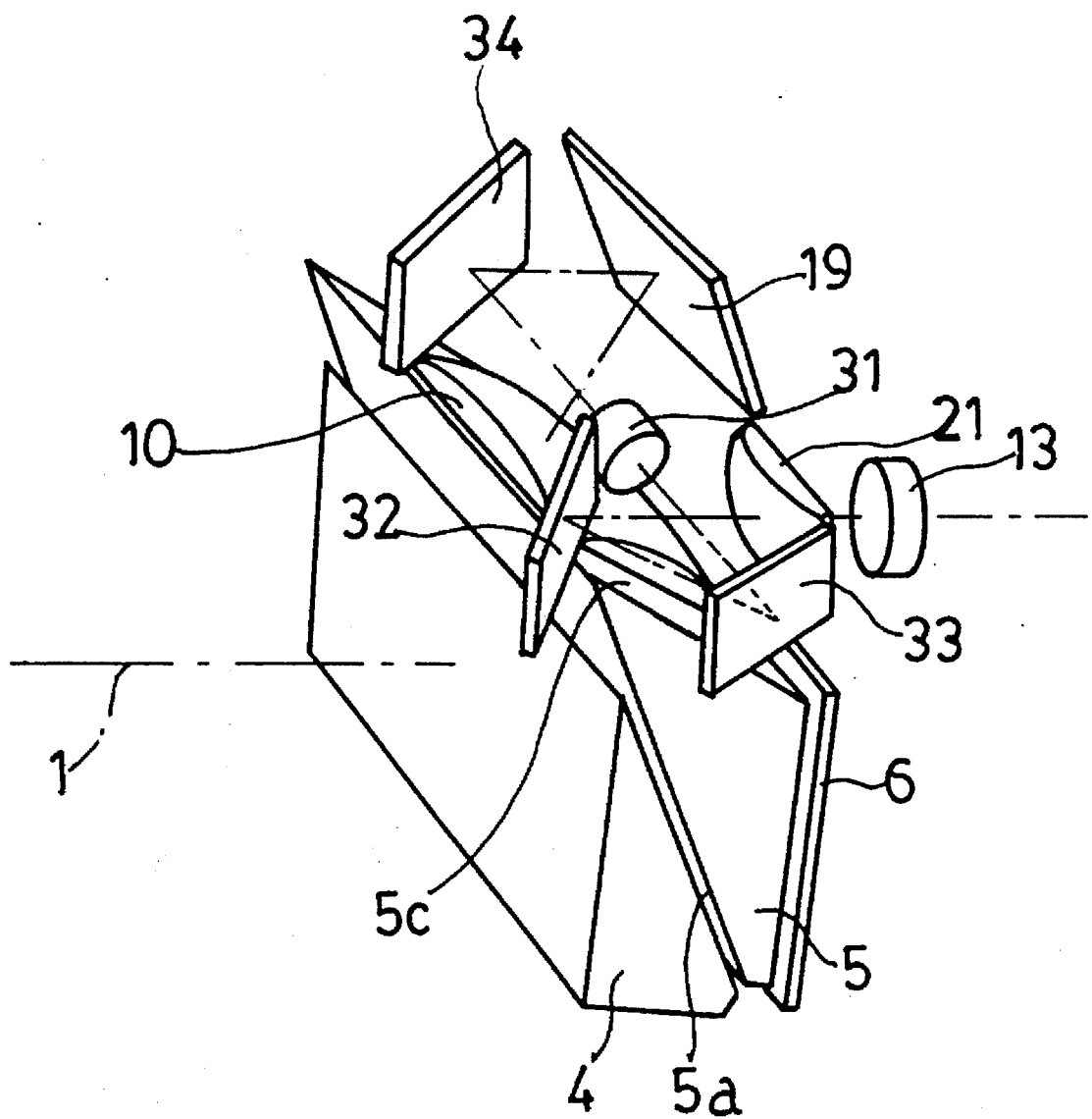
FIG. 17 is a cross-sectional view showing a single-lens reflex camera according to the twelfth embodiment of the present invention.

In the embodiment shown in FIG. 17, the converging light bundle passing through the condenser lens 10 advances upward and slightly backward (on the photographer side) and then is reflected forward (in the direction of the camera object) and in parallel with the optical axis in the photographing optical system by the mirror 19. The mirror 34 arranged slantingly or at an angle of 25° to the optical axis 1 reflects horizontally the light bundle to the relay lens 31. The light bundle passing through the relay lens 31 further advances toward a pair of mirrors 32 and 33 arranged at an angle of 45°. The mirrors 32 and 33 reflects the light bundle twice to form the secondary image near to the field lens 21. The photographer views the secondary image through the eyepiece.

In the embodiment shown in FIG. 17, the pair of mirrors 32 and 33 may be substituted for a pentagonal prism. An integration of the relay lens 31 and the mirror 33 may be substituted for the reflex relay lens 11 described in the item (8) shown in FIG. 1. Moreover, the mirror 32 may be substituted for the reflex field lens 21. The integration of the relay lens 31 and the mirror 32 may be substituted for the reflex relay lens described in the item (8) in the embodiment shown in FIG. 1.

In the embodiments shown in FIGS. 18, 19, 20, 21, 35, and 36, a part of the optical axis in the viewfinder optical system does not lie in the plane including the optical axis in the photographing system. The relay lens 31 and the condenser lens 10 are not arranged. The primary image produced by the photographing lens is viewed through the viewfinder optical system.

Figure 30:
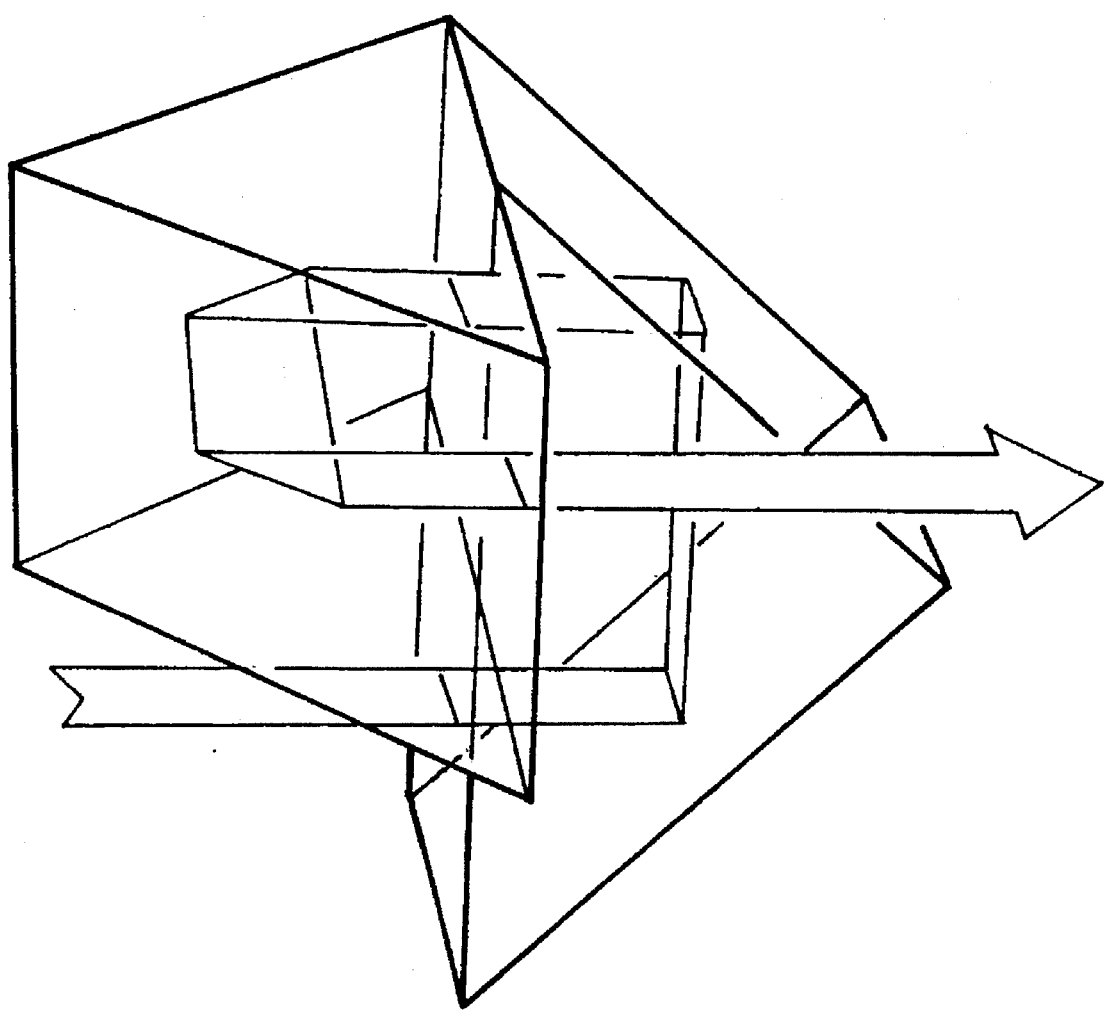
FIG. 30 is a perspective view of a conventional I-type Polo-prism.

In the embodiments shown in FIGS. 18, 19, 20, 21, 35, and 36, the optical path of the viewfinder optical system is similar to the Polo-prism I-type optical path (refer to FIG. 30) and the Polo-prism II-type optical path (refer to FIG. 31), well-known as an erect optical system for the conventional telescope. The difference is as follows:

The original Polo-system includes a four-plane reflective optical element, but the present system includes a six-plane optical element.

In the original Polo-system, the plane reflective optical element with a reflection surface of an angle of 45° reflects an incident light beam in the direction perpendicular to the incident light beam. In the present viewfinder optical system, the incident light beam is reflected twice on the Fresnel mirror 6 and the slant surface 5a of the second prism 5 substantially vertically (at the right angle with a variation of about 20°). The first reflection provides an extra reflection, comparing with the Polo-system. The requisite condition to form the viewfinder image corrected vertically and horizontally is that reflection occurs even number times. In the present viewfinder optical system, a roof prism is added to increase the reflection frequency to six.

Figure 18:
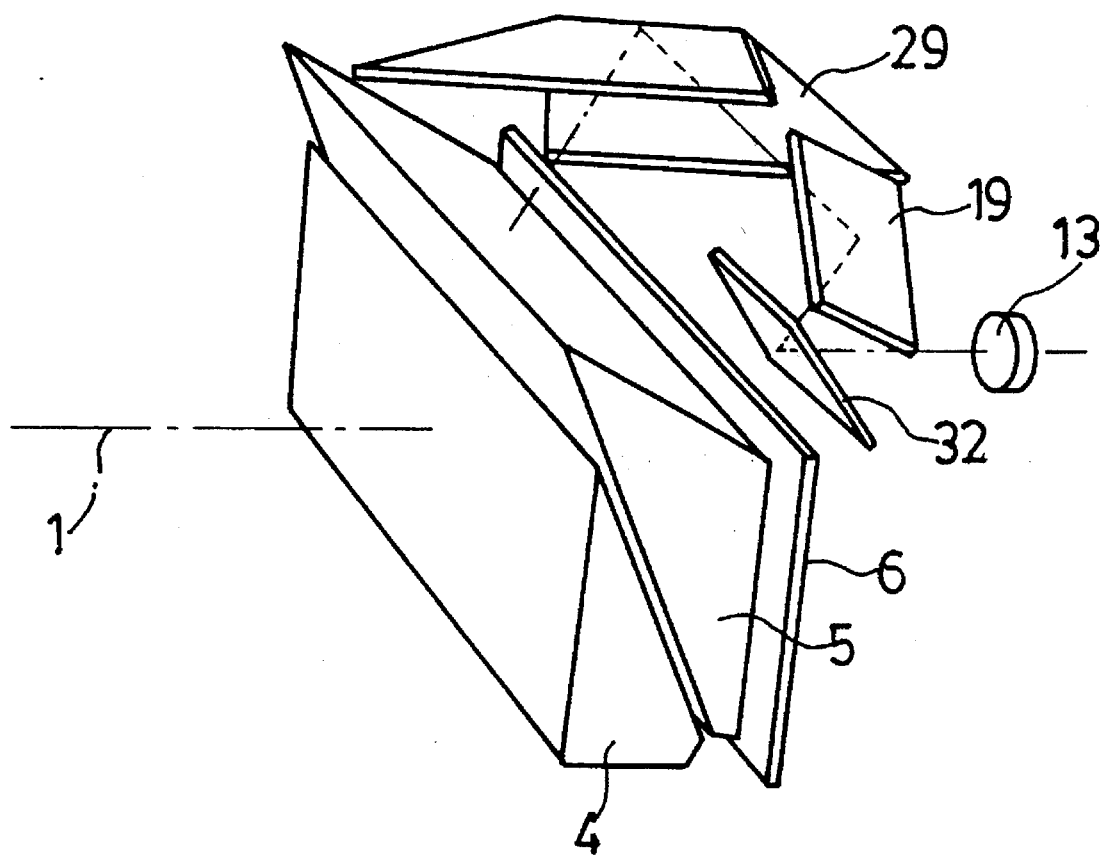
FIG. 18 a perspective view showing a single-lens reflex camera according to the thirteenth embodiment of the present invention.
Figure 19:
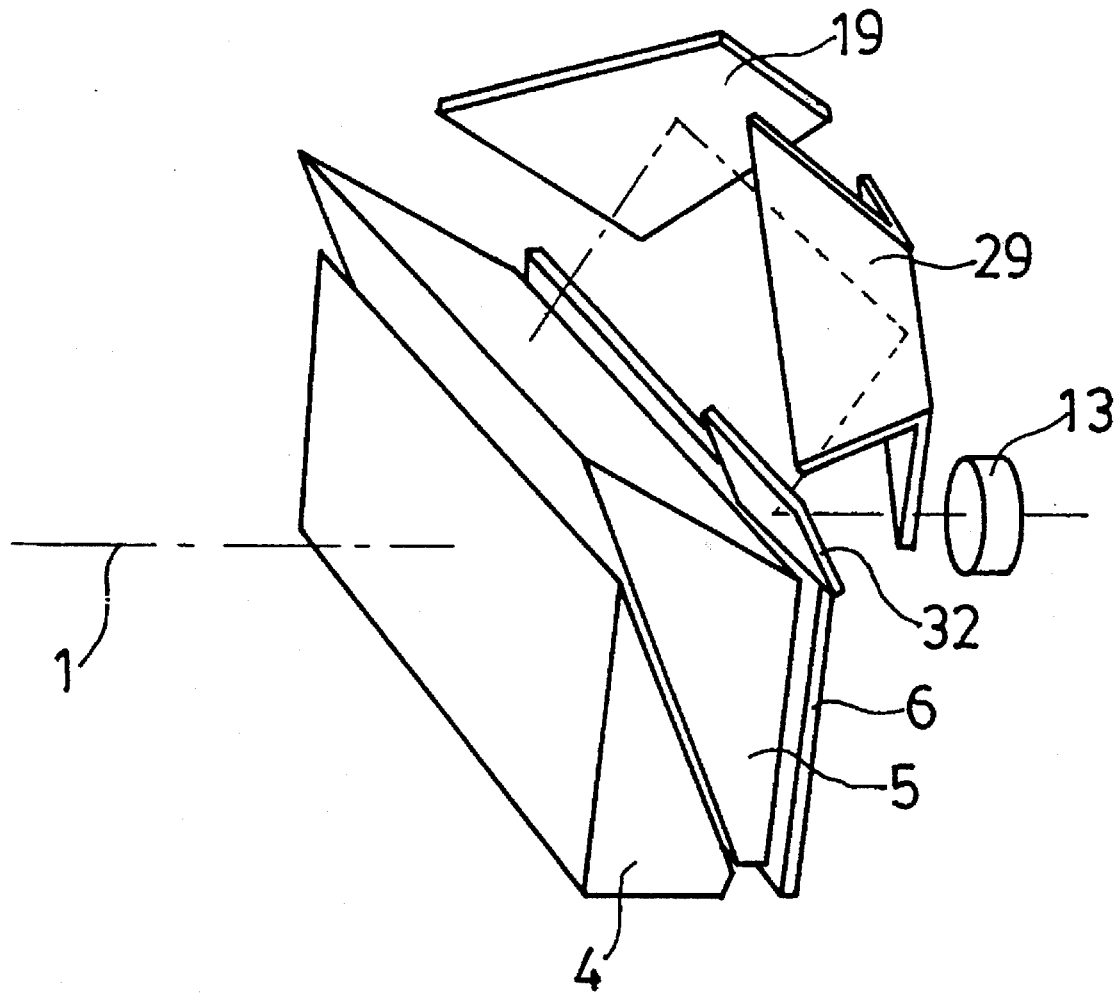
FIG. 19 is a perspective view showing a single-lens reflex camera according to the fourteenth embodiment of the present invention.
Figure 20:
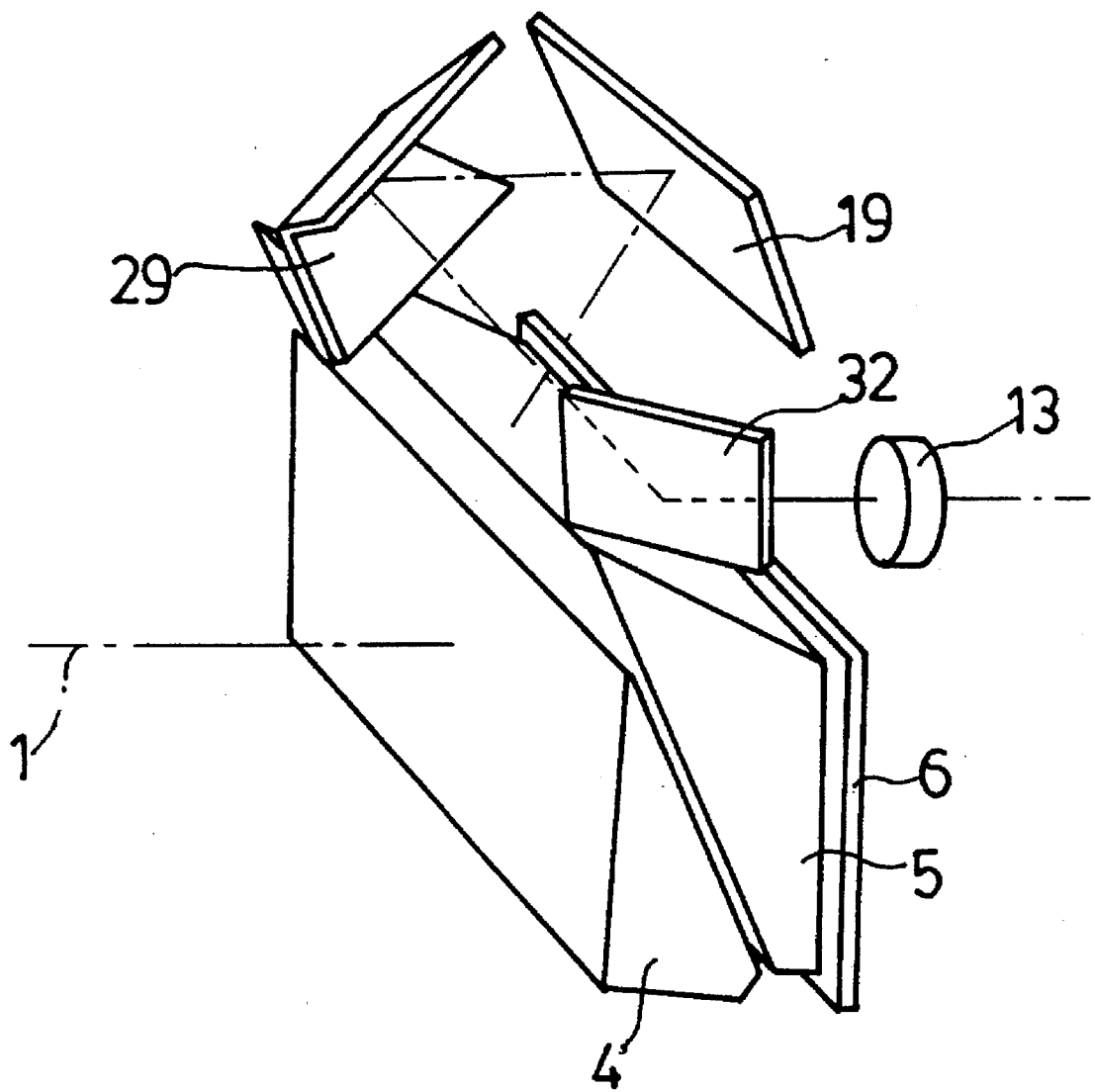
FIG. 20 is a perspective view showing a single-lens reflex camera according to the fifteenth embodiment of the present invention.
Figure 21:
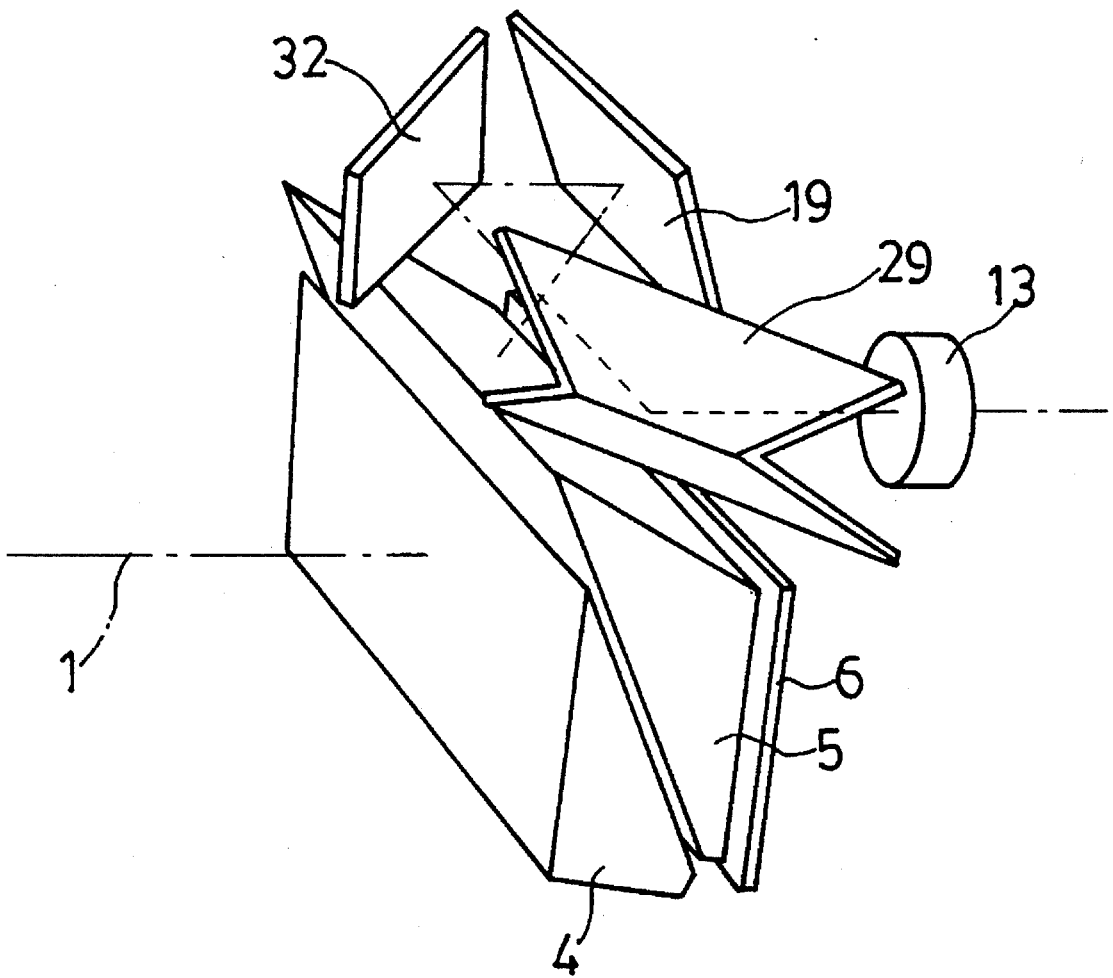
FIG. 21 is a perspective view showing a single-lens reflex camera according to the sixteenth embodiment of the present invention.
Figure 31:
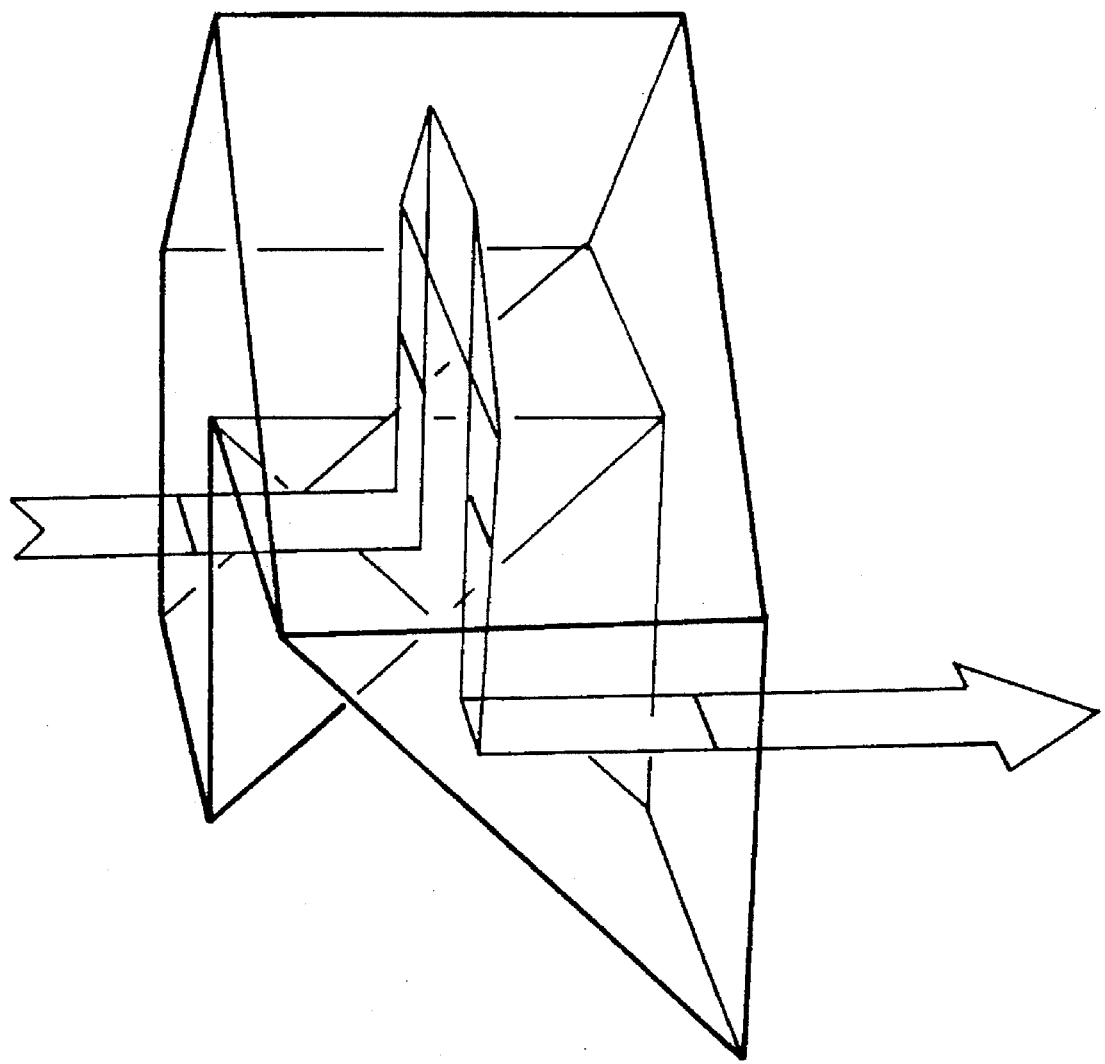
FIG. 31 is a perspective view showing a conventional II-type Polo-prism.
Figure 35:
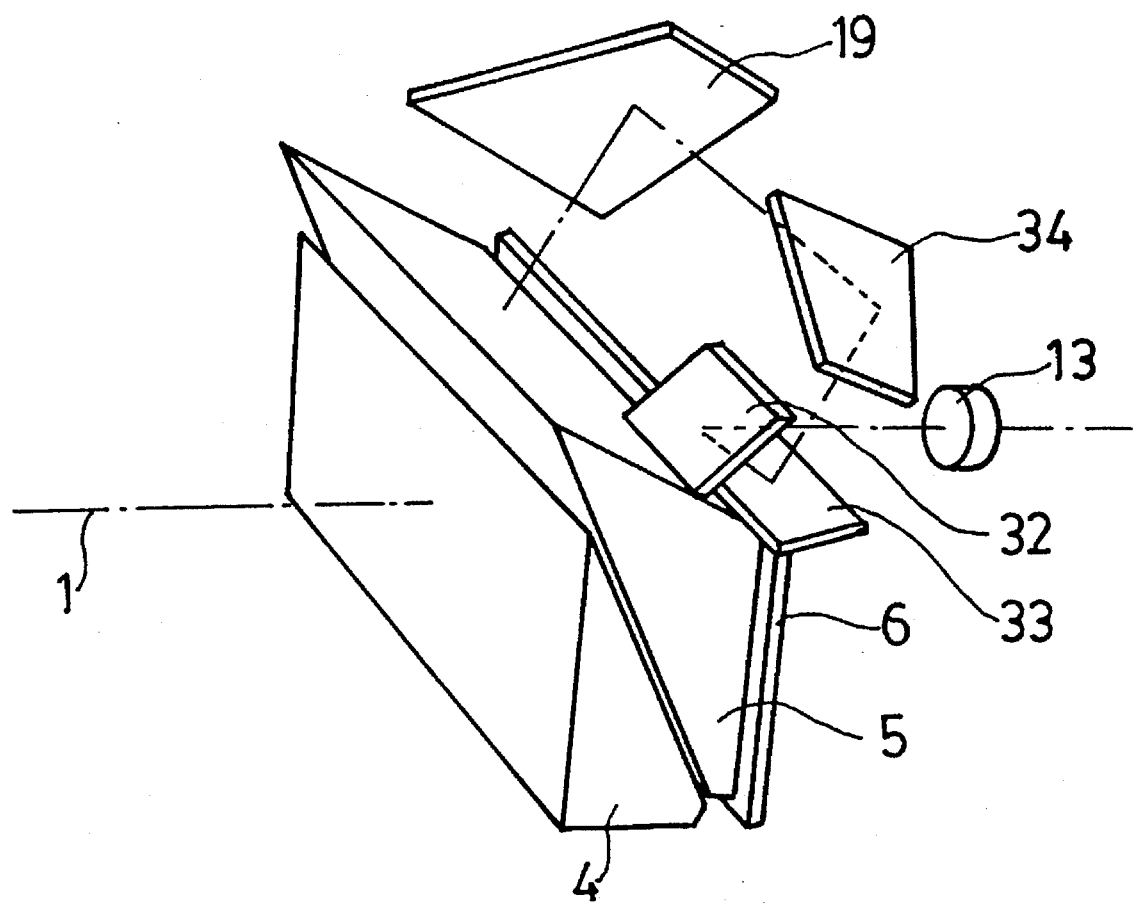
FIG. 35 is a perspective view showing a single-lens reflex camera according to the eighteenth embodiment of the present invention.
Figure 36:
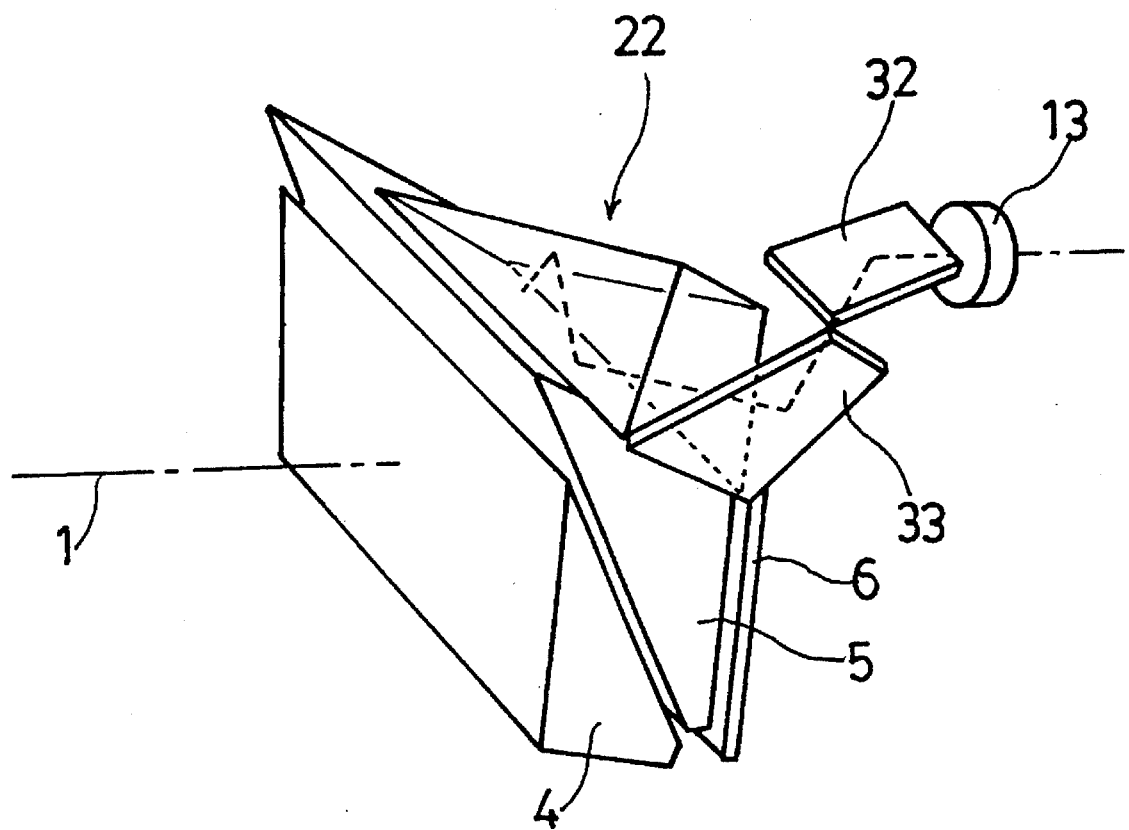
FIG. 36 is a perspective view showing a single-lens reflex camera according to the nineteenth embodiment of the present invention. of the image plane.

The embodiments shown in FIGS. 18, 19, and 35 is of the type belonging to the Polo-prism system II series shown in FIG. 31. The embodiments shown in FIGS. 20, 21, and 36 is of the type belonging to the Poly-system I series shown in FIG. 30. The embodiment shown in FIG. 18 is different from the embodiment shown in FIG. 19 in the roof prism is arranged at a different place. In the embodiment shown in FIG. 35, four plane mirrors 19, 32, 33, and 34 are used for reflection, without using the Dach surface. In the embodiment shown in FIG. 36, the triangle prism 22 is arranged to reflect twice, without using the roof mirror. The embodiment shown in FIG. 20 differs from the embodiment shown in FIG. 21 in the position where the roof mirror 29 is arranged.

In the embodiments shown in FIGS. 15, 16, 17, 18, 19, 20, 21, 34, 35, and 36, the light bundle reflected horizontally to the optical axis in the photographing optical system is reflected to the right direction viewed from the camera (on the camera object side). However, the light bundle may be reflected in the left direction. Generally, cameras are designed for right-handed photographers. It is desirable that the light bundle is reflected in the right direction to the photographing optical axis, in consideration of the viewfinder eyepiece unit which is conveniently arranged on the right side viewed from the front of the camera (on the camera object side).

The embodiments of the viewfinder optical system are shown in FIGS. 1, 3, 7, 8, 9, 11, 12, 13, 14, 15, 16, 17, 18, 19, 20, 21, 34, 35, and 36. In the embodiments, the viewfinder optical system observes the image as an aerial image formed by the photographing lens (the primary forming image or the secondary forming image). The human naked eye with a distance adjusting function can clearly observe the aerial image in any position within some range. In the conventional single-lens reflex cameras, a mat-type focusing screen, microprism, or split image prism has been used to examine the degree of focusing or blurring.

The mat-type forming screen, microprism, or split image prism conventionally embedded for the single-lens reflex camera is a transparent (refractive) optical element. In this case, the primary image forming position is near to the Fresnel mirror surface in the viewfinder optical system. A Fresnel mat plane mirror, a microprism, and a split image mirror are used as reflective optical elements. Even if any-type reflective optical elements are applied to the surface of the Fresnel mirror 6, there is a positional variation of several millimeters between the photosensitive surface 9 and the Fresnel mirror 6 in the present viewfinder system. Compensating the variation can secure the focusing degree of the camera object image.

Figure 25:
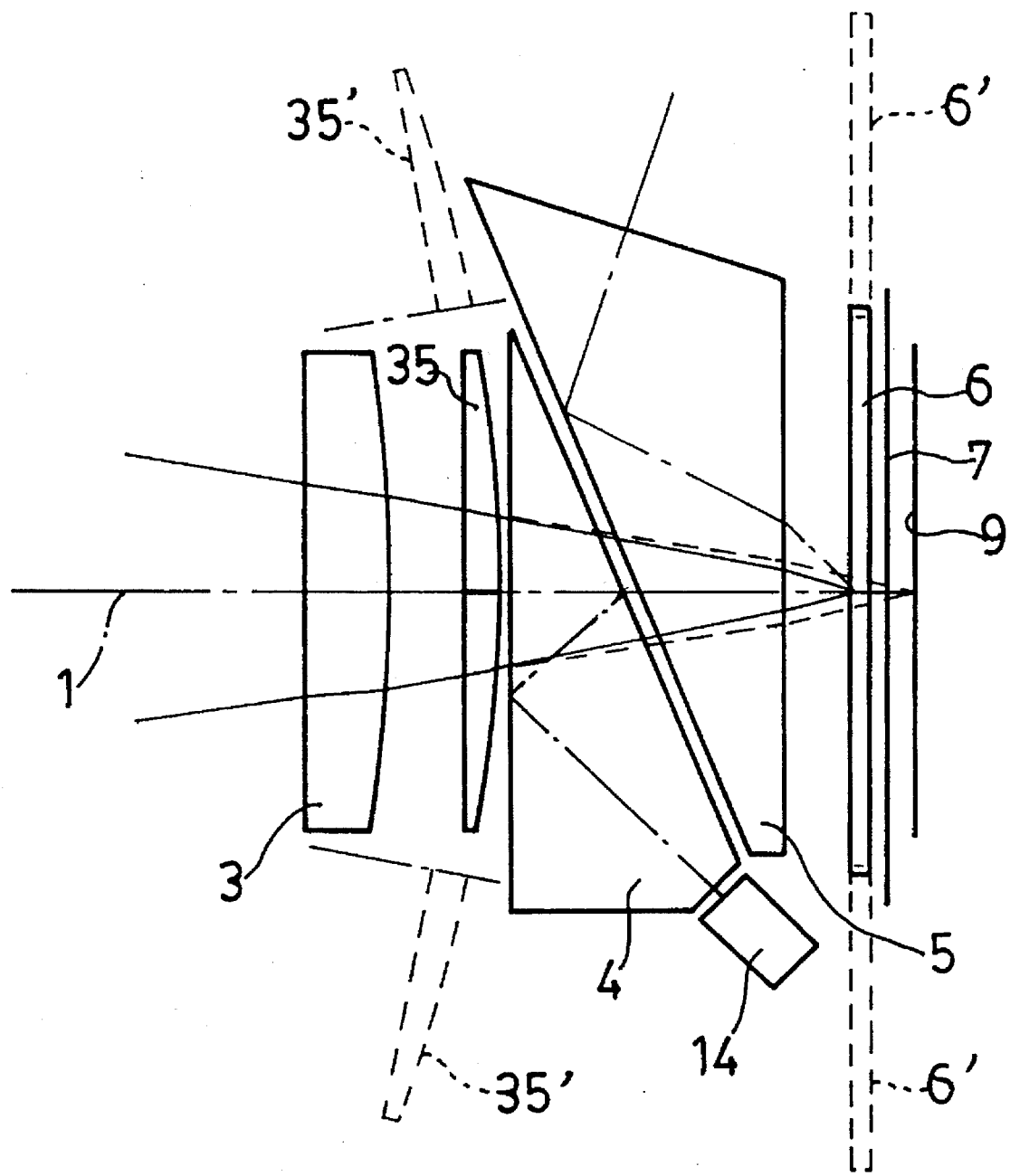
FIG. 25 is a cross-sectional view showing image position compensating means according to the second embodiment of the present invention.
Figure 26:
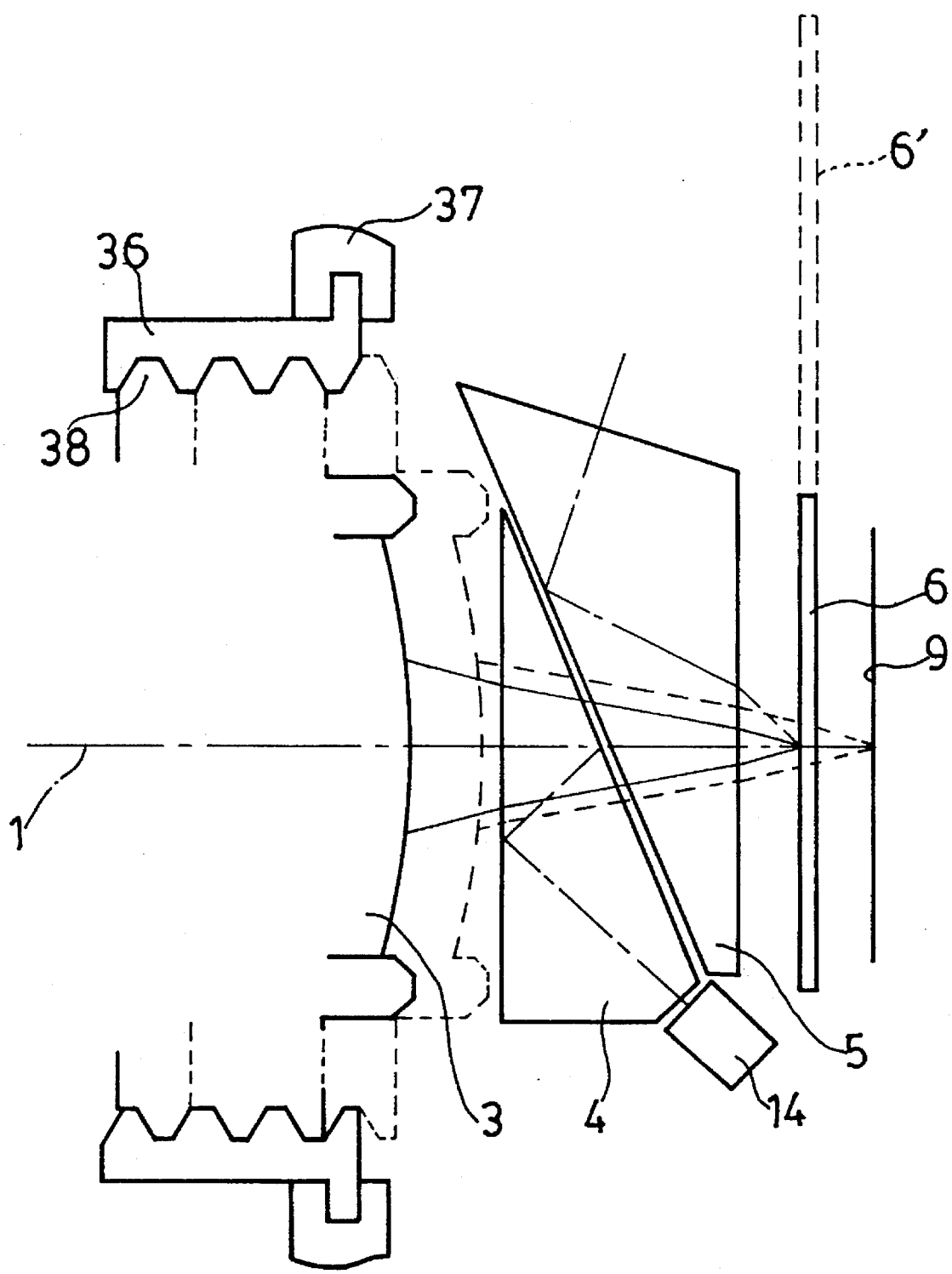
FIG. 26 is a cross-sectional view showing image position compensating means according to the third embodiment of the present invention.

FIGS. 22, 25, and 26 show an embodiment of the first image forming position compensating means where a photographer can secure the focusing degree of the camera object image within the viewfinder visual field.

FIG. 22 shows an embodiment of a focus position (image forming position) compensating lens 35 attachable between the photographing lens 3 on the optical axis in the photographing optical system and the first prism 4 in the photographing optical system.

The focus position compensating lens 35 is in the optical path in the viewfinder optical system at the viewfinder observation time. The photographer views the camera object image through the focus position compensating lens 35. The TTL photo sensor 14 receives distance information of the camera object image via the focus position compensating lens 35 to drive the autofocus mechanism (not shown). At the photographing time, the Fresnel mirror 6 is withdrawn out of the optical path in the photographing optical system so that the camera object image formed by the photographing lens is focused on the photosensitive surface 9 (shown in broken line). With the focus position compensating lens 35 from the photosensitive surface 9 20 mm apart, the Fresnel mirror 6 from the photosensitive surface 3 mm apart, and BK7 manufactured prisms 4 and 5 of a total thickness of 13 mm, the focus distance of the focus position compensating lens 35 is about 46 mm.

Figure 24:
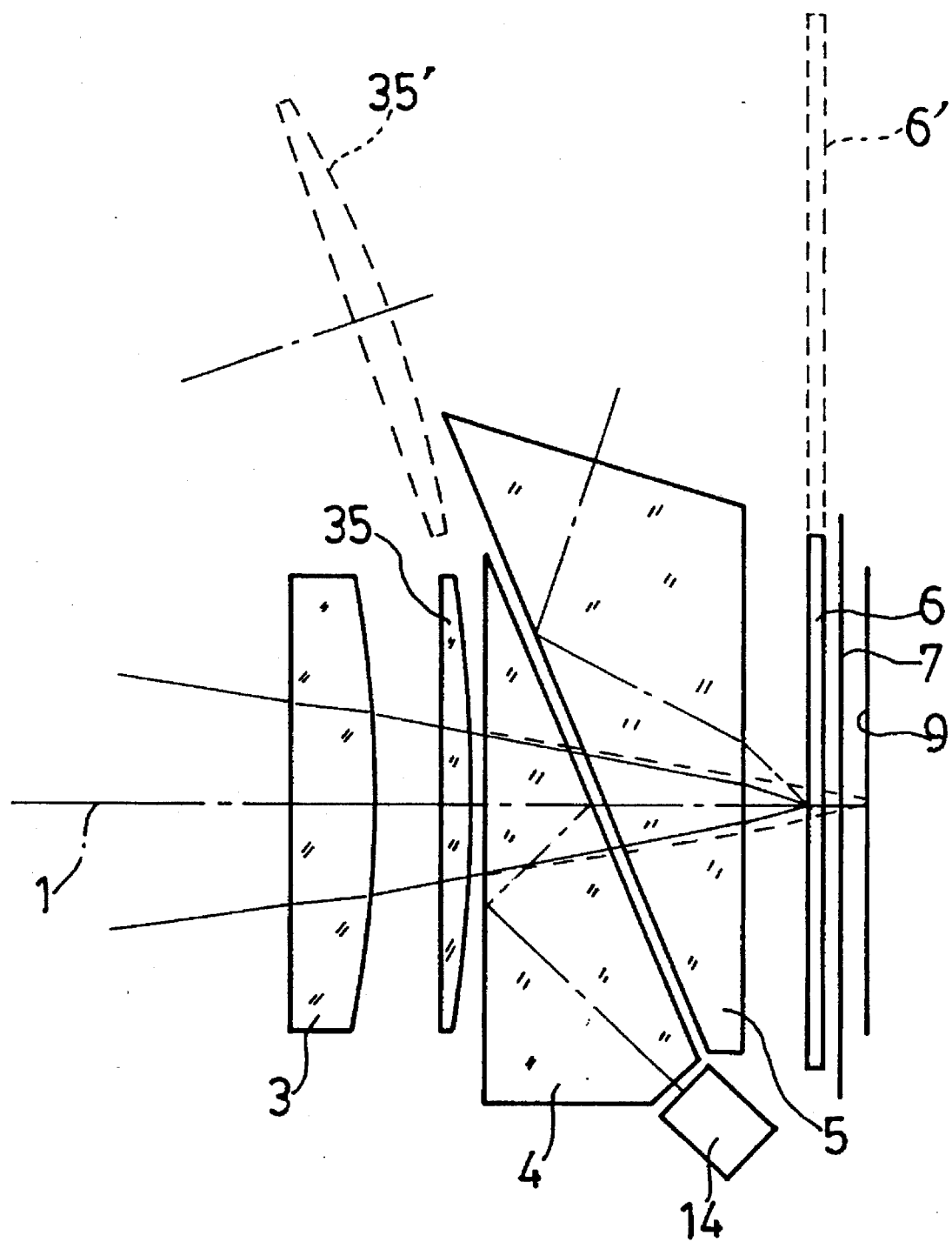
FIG. 24 is a cross-sectional view showing image position compensating means according to the first embodiment of the present invention.

FIG. 25 shown another embodiment of the focus position compensating lens 35. In the system shown in FIG. 24, the focus position compensating lens 35 is withdrawn out of the optical axis in the photographing optical system. If it is difficult to secure the withdrawing space, the focus position compensating lens 35 may be split as shown in FIG. 25. Fresnel mirror 6 may be split so as to withdraw, as shown in FIG. 25.

FIG. 26 shows an embodiment of a mechanical compensation acting as image forming position compensating means. A lens moving device such as a helicoid mechanism is arranged within the camera body and the lens barrel. At the viewfinder observation time, the photographing lens 3 advances toward the camera object by the distance between the photosensitive surface 9 and the surface of the Fresnel mirror 6. With the photographing lens 3 protruded, the photographer can view the camera object image formed on the surface of the Fresnel mirror 6. With the photographing lens 3 protruded, the TTL photo sensor 14 receives the distance information of a camera object to drive the autofocus mechanism. At a moment of photographing, while the Fresnel mirror withdraws out of the optical axis of the photographing optical system, the helicoid rotates by a predetermined degree to move the lens 3 toward the photosensitive surface 9 by a distance between the photosensitive surface 9 and the surface of the Fresnel mirror 6 so that the camera object image is focused on the photosensitive surface 9 (shown in broken line).

In FIG. 26, the female helicoid 36 is rotatably supported to the helicoid supporting ring 37. The male helicoid 38 is engaged with the female helicoid 36 and is in fixed state (as a stopper (not shown)). The photographing lens 3 is fixed to the male helicoid 38. The female helicoid 36 is rotated to a predetermined angle immediately before a photographing time to retreat directly the male helicoid 38.

The image forming position compensating means may be integrated with the autofocus adjusting mechanism. Means may be arranged which stores previously an image forming position compensation amount in an autofocus adjusting mechanism; moves the autofocus adjusting mechanism based on camera object distance information obtained by the TTL photo sensor 14 at a viewfinder observation time to form once the camera object image on the Fresnel mirror 6; and moves the autofocus adjusting mechanism by the compensated amount stored immediately before a photographing time to form a camera object image on the photosensitive surface 9.

Figure 27:
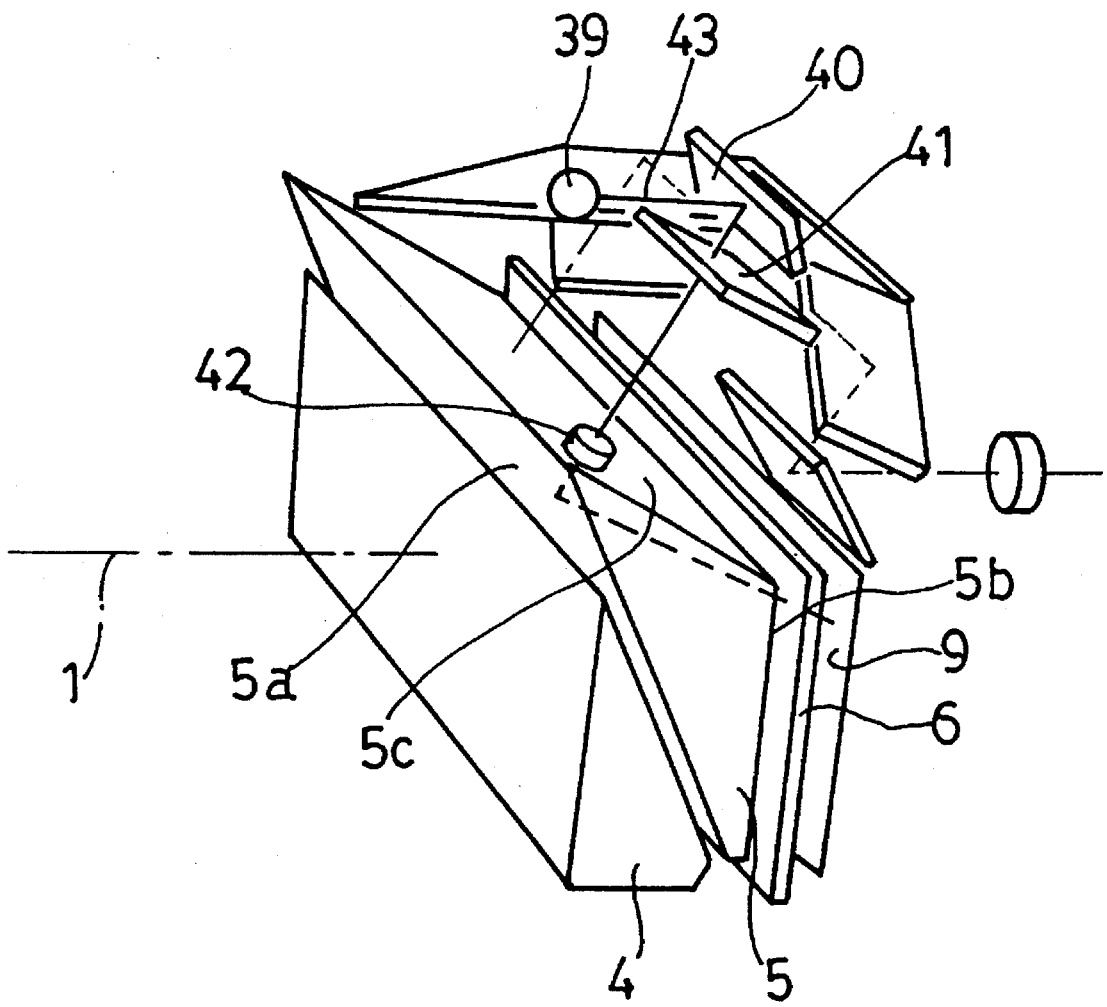
FIG. 27 is a perspective view showing data photographing means according to the first embodiment of the present invention.
Figure 28:
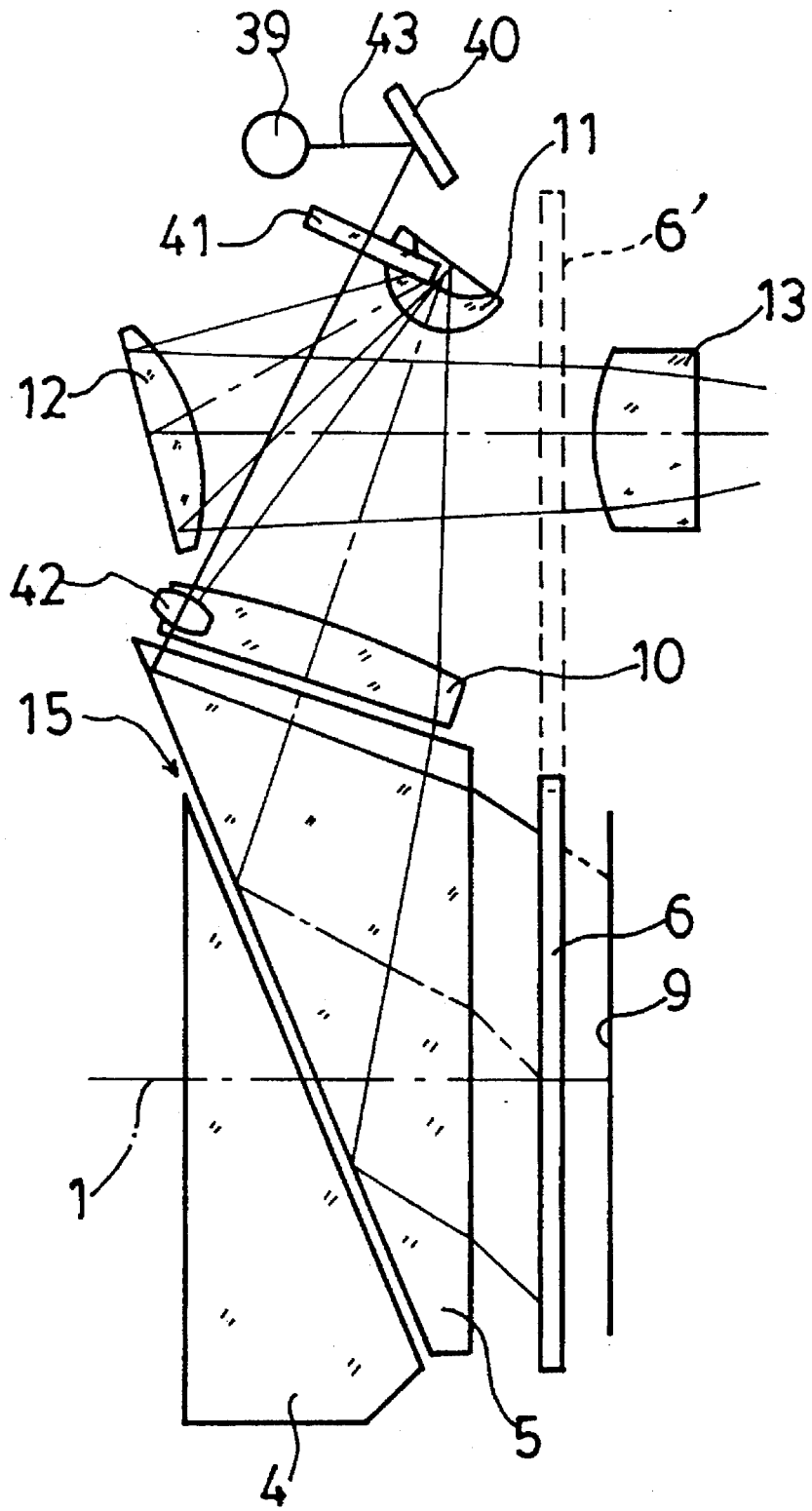
FIG. 28 is a perspective view showing data photographing means according to the second embodiment of the present invention.

FIGS. 27 and 28 show an embodiment of a mechanism of taking data on the photograph film. When data such as date is taken on the conventional photograph film, means has been used which positions a liquid crystal panel in contact with the rear surface of the photograph film and records an image of the liquid crystal back-lighted on the photosensitive surface on the front surface of the photograph film. According to the conventional method, a record is made by light passing through a base of a photograph film and a halation preventing layer formed on the base having a light absorption function. As a result, there are disadvantages in that large light amount loss occurs, the transparent light inclined toward longer wavelength becomes reddish, and the light dispersion degrades sharpness.

There is a method of directly recording on the front surface of a photograph film. However, it is needed to the optical element such as a fine mirror for guiding a light bundle for data recording on the photosensitive surface on a photograph film, near to the photographing lens in front of a camera or on the upper portion of the camera body.

Introducing data taking mechanism to the single-lens reflex can be relatively easily realized by using a photographing optical series prism for guiding a light bundle to the viewfinder optical system.

In FIG. 27, the light source mirror 40 with light condensing function reflects the light bundle 43 irradiated from the data taking lamp 39 as a weak converging light bundle to the liquid crystal panel 41 to guide to the data taking lens 42.

The weak converging light bundle passes through the data taking lens 42 and enters the upper surface 5c of the second prism 5 in the photographing optical system.

The center portion of the prism 5c is an optical path of the light bundle advancing toward the viewfinder optical system. The light bundle reflected by the Fresnel mirror 6, which depends somewhat on the model of adopted viewfinder series, passes through the center portion. The both sides of the prism surface 5c become a dead space which is utilized to take data.

The data taking light bundle 43 enters from the right corner (viewed from the front of the camera) of the surface 5c facing the camera object into the prism 5. The data taking light bundle 43 reflects totally on the slant surface 5a of the prism and goes out of the prism surface 5b of the prism 5, thus forming an image of the liquid crystal panel 41 to the photosensitive surface 9. The position where the data taking light bundle 43 enters the prism surface 5c depends on the position of the photograph screen on which data is projected.

When the light bundle enters to the right side of the prism 5c (viewed from the camera object), the image is projected on the right side of the camera screen. When the light bundle enters to the prism surface 5c (facing the front of the camera), the image is projected on the lower side of the camera screen.

FIG. 28 shows an embodiment of the data taking means applied to the first embodiment. In the embodiment shown in FIG. 1, the condenser lens 10 is arranged adjacent to the upper surface 5c of the prism 5. However, there is a dead space near to the outer sides of the condenser lens above the upper surface 5c of the prism 5. Like the embodiment shown in FIG. 27, the idle space can be prepared to introduce the data taking light bundle 43.

As described above, the single-lens reflex system can shorten the lens back to about 20 mm, or about 12 mm at minimum, whereby the thin camera body can be designed. Lenses, particularly wide-angle series zoom lenses, can be designed in compact size. The camera body has a total height of 40 mm from the optical axis in the photographing optical system and about 70 mm from the bottom surface thereof. Hence a compact camera body can be realized with the viewfinder function of a single-lens reflex.

Furthermore, there is an additional advantage in that the TTL photo sensor for TTL-AE system and AF system indispensable for a single-lens reflex camera can be easily mounted in a camera body. It is possible to take easily the data taking means and means for photographing a modified frame-size image such as panorama-size image.

What is claimed is:

1. A camera comprising:

a photographing lens;

a photosensitive surface;

a prism body including a first prism and a second prism which are arranged between said photographing lens and said photosensitive surface and in order from said photographing lens, and a low refractive index layer sandwiched between said first prism and said second prism, said low refractive layer spreading slantingly with respect to the photographing system optical axis extending from photographing lens to said photosensitive surface, said a low refractive index layer having a refractive index lower than that of said second prism;

a viewfinder optical system; and a reflective optical system arranged so as to reciprocate freely between a reflective position between said prism body and said photosensitive surface and a photographing position withdrawn from said reflective position, said reflective optical system for irradiating a light to said second prism, whereby when said reflective optical system is at said reflective position, said reflective optical system reflects a light advancing from said prism body toward said photosensitive surface, and reflects said advancing light at an interface of said second prism in contact with said low refractive index layer, so that said reflected light enters said viewfinder optical system via an adjacent surface arranged near to said viewfinder optical system.

2. A camera according to claim 1, wherein said first prism comprises a transparent container and a transparent liquid filled in said transparent container, and wherein said second prism comprises a transparent container and a transparent liquid filled in said transparent container.

3. A camera according to claim 1, further comprising a sensor for reflecting a light reflected on a surface of said first prism facing said low refractive index.

4. A camera according to claim 1, wherein said reflective optical system moves between said reflective position and said photographing position and along said photosensitive surface.

5. A camera according to claim 1, wherein said reflective optical system comprises plural split elements each which moves toward a photographing position.

6. A camera according to claim 5, further comprising adjusting means for adjusting a moving stroke of each of said plural split elements.

7. A camera according to claim 1, wherein said reflective optical system acts as a light shielding body that shields said irradiated light from irradiating said photosensitive surface when said reflective optical system is at said reflective position.

8. A camera according to claim 1, wherein reflective optical system acts as an eyepiece shutter for shuttering a reversely entered light when said reflective optical system is at said photographing position, said reversely intruded light entering from said viewfinder eyepiece and falling said photosensitive surface via said viewfinder optical system.

9. A camera according to claim 1, wherein said reflective optical system comprises a Fresnel mirror having a light condensing and deflecting function.

10. A camera according to claim 9, wherein said Fresnel mirror has a front surface engraved so as to produce a predetermined light condensing function, said surface facing said prism body, and a rear surface being a mirror surface engraved so as to produce a predetermined deflecting function and to reflect a light irradiated from said front surface toward said front surface, said rear surface facing said photosensitive surface.

11. A camera according to claim 9, wherein said Fresnel mirror has a front surface engraved so as to produce a predetermined light condensing function, said surface facing said prism body, and a rear surface being a mirror surface engraved so as to produce a predetermined condensing function and a predetermined deflecting function and to reflect a light irradiated from said front surface to said front surface, said rear surface facing said photosensitive surface.

12. A camera according to claim 9, wherein said Fresnel mirror has a front surface engraved so as to form a predetermined cylindrical Fresnel lens, said front surface facing said prism body, and a rear surface being a mirror surface engraved so as to form a predetermined cylindrical Fresnel mirror and to reflect a light irradiated from said front surface to said front surface, said rear surface facing said photosensitive surface, said front surface and said rear surface having equal or different focus distances in a direction perpendicular to each other.

13. A camera according to claim 1, further comprising image compensating means for compensating a position of a camera object image with said reflective optical system moving, in such a way that said camera object image is formed on a predetermined plane of said reflective optical system when said reflective optical system is at a predetermined reflective position, and said camera object image is formed on said photosensitive surface when said reflective optical system is at said photographing position.

14. A camera according to claim 1, further data displaying means for displaying data on said photosensitive surface, said data being irradiated from said adjacent surface of said second prism to said second prism, reflected at said interface of said second prism, and projected to said photosensitive surface via an optical path.

15. A camera according to claim 1, wherein said viewfinder optical system comprises a relay lens, and a light condenser lens arranged adjacently to said adjacent surface of said second prism.

16. A camera according to claim 15, wherein said relay lens comprises a reflection-type lens.

17. A camera according to claim 1, wherein said viewfinder optical system includes a cylindrical lens acting as means for reversing said viewfinder image from the right side to and the left side.

18. A camera according to claim 1, wherein said viewfinder optical system includes an eyepiece shutter for shielding a reversely entering light falling on said photosensitive surface from said viewfinder eye piece via said viewfinder optical system, in cooperation with said reflective optical system moving to said photographing position.

19. A camera according to claim 1, wherein said low refractive index layer on said prism body is formed of a combination of plural layers, said plural layers splitting and reflecting light in plural different directions at said interface of said second prism, said light being reflected in said reflective optical system positioned at said reflective position to advancing to said second prism; and wherein said viewfinder optical system synthesizes the light split in plural directions and irradiated from said prism body to form a viewfinder image.

* * * * *